United States Patent
Brown-Tseng et al.

(10) Patent No.: US 12,344,762 B2
(45) Date of Patent: Jul. 1, 2025

(54) PHOSPHATE RESISTANT ELECTRODEPOSITABLE COATING COMPOSITIONS

(71) Applicant: PPG Industries Ohio, Inc., Cleveland, OH (US)

(72) Inventors: Elizabeth Stephenie Brown-Tseng, Gibsonia, PA (US); Lee Brent Steely, Sewickley, PA (US); Richard F. Syput, Lower Burrell, PA (US); Corey James Dedomenic, Trafford, PA (US); Christopher Andrew Dacko, Pittsburgh, PA (US); Egle Puodziukynaite, Ridgecrest, CA (US); Kevin Thomas Sylvester, Pittsburgh, PA (US); Benjamin Kabagambe, Cheswick, PA (US); Katie Marie Cumpston, North Versailles, PA (US); David Alfred Stone, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/259,434

(22) PCT Filed: Dec. 30, 2021

(86) PCT No.: PCT/US2021/065690
§ 371 (c)(1),
(2) Date: Jun. 27, 2023

(87) PCT Pub. No.: WO2022/147255
PCT Pub. Date: Jul. 7, 2022

(65) Prior Publication Data
US 2024/0076520 A1 Mar. 7, 2024

Related U.S. Application Data

(60) Provisional application No. 63/132,719, filed on Dec. 31, 2020.

(51) Int. Cl.

| | | |
|---|---|---|
| *C09D 175/08* | (2006.01) | |
| *C08G 18/08* | (2006.01) | |
| *C08G 18/16* | (2006.01) | |
| *C08G 18/20* | (2006.01) | |
| *C08G 18/22* | (2006.01) | |
| *C08G 18/28* | (2006.01) | |
| *C08G 18/32* | (2006.01) | |
| *C08G 18/58* | (2006.01) | |
| *C08G 18/76* | (2006.01) | |
| *C08G 18/80* | (2006.01) | |
| *C09D 5/44* | (2006.01) | |
| *C25D 3/54* | (2006.01) | |
| *C25D 5/54* | (2006.01) | |
| *C25D 13/06* | (2006.01) | |

(52) U.S. Cl.
CPC ....... *C09D 175/08* (2013.01); *C08G 18/0814* (2013.01); *C08G 18/163* (2013.01); *C08G 18/2072* (2013.01); *C08G 18/227* (2013.01); *C08G 18/2835* (2013.01); *C08G 18/3206* (2013.01); *C08G 18/584* (2013.01); *C08G 18/7664* (2013.01); *C08G 18/8019* (2013.01); *C08G 18/8064* (2013.01); *C09D 5/4465* (2013.01); *C09D 5/448* (2013.01); *C25D 3/54* (2013.01); *C25D 5/54* (2013.01); *C25D 13/06* (2013.01); *C08G 2150/00* (2013.01)

(58) Field of Classification Search
None
See application file for complete search history.

(56) References Cited

U.S. PATENT DOCUMENTS

| | | |
|---|---|---|
| 4,785,068 A | 11/1988 | Tominaga et al. |
| 7,842,762 B2 | 11/2010 | Zawacky |
| 8,389,651 B2 | 3/2013 | Moore |
| 8,795,836 B2 | 8/2014 | Kaylo |

(Continued)

FOREIGN PATENT DOCUMENTS

| | | |
|---|---|---|
| EP | 2898960 A1 | 7/2015 |
| EP | 3266842 A1 | 1/2018 |

(Continued)

OTHER PUBLICATIONS

International Search Report and Written Opinion received for PCT Application Serial No. PCT/US2021/065690 dated May 6, 2022, 12 pages.

*Primary Examiner* — Wojciech Haske
(74) *Attorney, Agent, or Firm* — Rebeca Himena Miller

(57) ABSTRACT

The present invention is directed to an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0. Also disclosed are methods of treating electrodepositable coating compositions, methods for making electrodepositable coating compositions, systems for coating a metal substrate, coatings, coated substrates, and methods of coating a substrate.

15 Claims, No Drawings

(56) References Cited

U.S. PATENT DOCUMENTS

| | | |
|---|---|---|
| 8,884,059 B2 | 11/2014 | Zawacky |
| 8,980,078 B2 | 3/2015 | Inbe et al. |
| 9,068,089 B2 | 6/2015 | Van Buskirk |
| 9,157,006 B2 | 10/2015 | Iwata et al. |
| 9,598,588 B2 | 3/2017 | Hsu |
| 2006/0247341 A1 | 11/2006 | Hsieh et al. |
| 2007/0045116 A1 | 3/2007 | Hung |
| 2007/0051634 A1 | 3/2007 | Poole |
| 2009/0042060 A1 | 2/2009 | Zawacky et al. |
| 2011/0005937 A1* | 1/2011 | Zawacky ............ C09D 5/4496 |
| | | 205/229 |
| 2012/0225982 A1 | 9/2012 | Ravichandran et al. |
| 2015/0267315 A1 | 9/2015 | Schiller et al. |
| 2019/0276202 A1 | 9/2019 | Wilson |
| 2019/0276702 A1 | 9/2019 | Gontani et al. |
| 2019/0359867 A1 | 11/2019 | Eswarakrishnan |
| 2020/0283647 A1 | 9/2020 | Yasuhara et al. |

FOREIGN PATENT DOCUMENTS

| | | |
|---|---|---|
| JP | 2018-184489 A | 11/2018 |
| KR | 10-2010-0053624 A | 5/2010 |
| KR | 10-2019-0115061 A | 10/2019 |
| WO | 2016006657 A1 | 1/2016 |
| WO | 2017/051901 A1 | 3/2017 |

\* cited by examiner

PHOSPHATE RESISTANT ELECTRODEPOSITABLE COATING COMPOSITIONS

FIELD OF THE INVENTION

The present invention is directed towards an electrodepositable coating composition, methods of treating electrodepositable coating compositions, methods of maintaining electrodepositable coating compositions, treated substrates and methods of coating substrates.

BACKGROUND OF THE INVENTION

Electrodeposition as a coating application method involves the deposition of a film-forming composition onto a conductive substrate under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodeposition processes are used commercially. Blocked polyisocyanate curing agents are often used in electrodepositable coating compositions to effectuate cure of the coating once applied. Upon the application of external energy, such as heating, a blocking agent used to reversibly "block" the isocyanato groups of the blocked polyisocyanate curing agent is removed allowing the isocyanato groups to react with a polymeric binder resin and crosslink and cure the coating. Heating is often employed to remove blocking agents from a blocked isocyanato groups of the blocked polyisocyanate curing agent. Heating requires significant energy costs. Previous blocked polyisocyanate curing agents that unblock at relatively low temperatures have been difficult to make, are toxic, or are crystalline and difficult to handle. Additionally, while catalyst may be used to reduce the curing temperature of the coating composition, tin and lead catalysts have been subjected to a number of regulatory restrictions by various countries due to environmental concerns.

Bismuth has been considered as an alternative to tin and lead catalysts, but phosphate ions in the electrocoat coating composition may interfere with the action of the catalyst in catalyzing the cure reaction once the concentration of phosphate ions reaches certain levels. Therefore, coating compositions that cure using a bismuth catalyst that are less susceptible to interference from phosphate ions is desired.

SUMMARY OF THE INVENTION

The present invention provides an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention also provides a method of treating an electrodepositable coating composition comprising an at least partially solubilized bismuth catalyst and optionally a guanidine and/or a source of phosphate ions, the method comprising adding a guanidine or additional guanidine, and/or additional solubilized bismuth catalyst to the electrodepositable coating composition.

The present invention further provides a method for making an electrodepositable coating composition comprising an electrodepositable binder, an at least partially water-soluble bismuth catalyst, a guanidine, a pigment, and a phosphorus acid, the method comprising the steps of (1) dispersing the electrodepositable binder, the pigment, and the phosphorous acid in an aqueous medium to form a dispersed mixture; (2) adding the guanidine to the dispersed mixture; and (3) adding the bismuth catalyst to the dispersed mixture, wherein the at least partially water-soluble bismuth metal at least partially solubilizes in the mixture.

The present invention also provides a method for coating a substrate comprising the steps of pretreating a metal substrate with a metal phosphate pretreatment composition; and electrodepositing a coating from an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention further provides a method of maintaining an electrodepositable coating composition subject to a source of phosphate ions, the method comprising measuring the concentration of soluble bismuth metal and/or phosphate ions in the electrodepositable coating composition; measuring the concentration of guanidine in the electrodepositable coating composition; and adding guanidine in an amount sufficient to adjust a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention also provides a system for coating metal substrates, the system comprising a pretreatment composition comprising a metal phosphate; and an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention also provides an at least partially cured coating deposited from an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention further provides a substrate coated with a coating deposited from an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

DETAILED DESCRIPTION OF THE INVENTION

The present invention is directed to an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

According to the present invention, the term "electrodepositable coating composition" refers to a composition that is capable of being deposited onto an electrically conductive substrate under the influence of an applied electrical potential. As further described herein, the electrodepositable coating composition may be a cationic electrodepositable coating composition or an anionic electrodepositable coating composition.

Ionic Salt Group-Containing Film-Forming Polymer

According to the present invention, the electrodepositable coating composition comprises an ionic salt group-containing film-forming polymer. The ionic salt group-containing film-forming polymer is capable of being applied onto a substrate by electrodeposition. The ionic salt group-containing film-forming polymer may comprise a cationic salt group-containing film-forming polymer or an anionic salt group-containing film-forming polymer.

The ionic salt group-containing film-forming polymer may comprise a cationic salt group containing film-forming polymer. The cationic salt group-containing film-forming polymer may be used in a cationic electrodepositable coating composition. As used herein, the term "cationic salt group-containing film-forming polymer" refers to polymers that include at least partially neutralized cationic groups, such as sulfonium groups and ammonium groups, that impart a positive charge. The cationic salt group-containing film-forming polymer may comprise active hydrogen functional groups. The term "active hydrogen" refers to hydrogens which, because of their position in the molecule, display activity according to the Zerewitinoff test, as described in the JOURNAL OF THE AMERICAN CHEMICAL SOCIETY, Vol. 49, page 3181 (1927). Accordingly, active hydrogens include hydrogen atoms attached to oxygen, nitrogen, or sulfur, and thus active hydrogen functional groups include, for example, hydroxyl, thiol, primary amino, and/or secondary amino groups (in any combination). Cationic salt group-containing film-forming polymers that comprise active hydrogen functional groups may be referred to as active hydrogen-containing, cationic salt group-containing film-forming polymers.

Examples of polymers that are suitable for use as the cationic salt group-containing film-forming polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group containing film-forming polymers include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. A portion of the amine that is reacted with the polyepoxide may be a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and 3,928,157 at col. 2, line 29 to col. 3, line 21, these portions of both of which are incorporated herein by reference, may be used.

Besides amine salt group-containing resins, quaternary ammonium salt group-containing resins may also be employed as a cationic salt group-containing film-forming polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7; U.S. Pat. No. 3,975,346 at col. 1, line 62 to col. 17, line 25 and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at pg. 2, line 1 to pg. 6, line 25, this portion of which being incorporated herein by reference, may be employed.

Other suitable cationic salt group-containing film-forming polymers include those that may form photodegradation resistant electrodepositable coating compositions. Such polymers include the polymers comprising cationic amine salt groups which are derived from pendant and/or terminal amino groups that are disclosed in U.S. Patent Application Publication No. 2003/0054193 A1 at paragraphs [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in U.S. Patent Application Publication No. 2003/0054193 A1 at paragraphs [0096] to [0123], this portion of which being incorporated herein by reference.

The active hydrogen-containing, cationic salt group-containing film-forming polymer is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

wherein R is hydrogen or an alkyl group having 1 to 4 carbon atoms. Mixtures of the above-mentioned acids also may be used in the present invention.

The extent of neutralization of the cationic salt group-containing film-forming polymer may vary with the particular polymer involved. However, sufficient acid should be used to sufficiently neutralize the cationic salt-group containing film-forming polymer such that the cationic salt-group containing film-forming polymer may be dispersed in an aqueous dispersing medium at room temperature in the amounts described herein. For example, the amount of acid used may provide at least 20% of all of the total theoretical neutralization. Excess acid may also be used beyond the amount required for 100% total theoretical neutralization. For example, the amount of acid used to neutralize the cationic salt group-containing film-forming polymer may be 0.1% based on the total amines in the active hydrogen-containing, cationic salt group-containing film-forming polymer. Alternatively, the amount of acid used to neutralize the active hydrogen-containing, cationic salt group-containing film-forming polymer may be ≤100% based on the total amines in the active hydrogen-containing, cationic salt group-containing film-forming polymer. The total amount of acid used to neutralize the cationic salt group-containing film-forming polymer may range between any combination of values, which were recited in the preceding sentences, inclusive of the recited values. For example, the total amount of acid used to neutralize the active hydrogen-containing, cationic salt group-containing film-forming polymer may be equal to or greater than 20%, 35%, 50%, 60%, or 80% based on the total amines in the cationic salt group-containing film-forming polymer.

The cationic salt group-containing film-forming polymer may be present in the cationic electrodepositable coating composition in an amount of at least 40% by weight, such as at least 50% by weight, such as at least 60% by weight, and may be present in the in an amount of no more than 90% by weight, such as no more than 80% by weight, such as no more than 75% by weight, based on the total weight of the resin solids of the electrodepositable coating composition. The cationic salt group-containing film-forming polymer may be present in the cationic electrodepositable coating composition in an amount of 40% to 90% by weight, such as 50% to 80% by weight, such as 60% to 75% by weight, based on the total weight of the resin solids of the electrodepositable coating composition.

Alternatively, the ionic salt group containing film-forming polymer may comprise an anionic salt group-containing film-forming polymer. As used herein, the term "anionic salt group-containing film-forming polymer" refers to an anionic polymer comprising at least partially neutralized anionic functional groups, such as carboxylic acid and phosphoric acid groups, that impart a negative charge to the polymer. The anionic salt group-containing film-forming polymer may comprise active hydrogen functional groups. Anionic salt group-containing film-forming polymers that comprise active hydrogen functional groups may be referred to as active hydrogen-containing, anionic salt group-containing film-forming polymers. The anionic salt group containing film-forming polymer may be used in an anionic electrodepositable coating composition.

The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Patent Application Publication No. 2009-0045071 at [0004]-[0015] and U.S. patent application Ser. No. 13/232,093 at [0014]-[0040], the cited portions of which being incorporated herein by reference. Also suitable are resins comprising one or more pendent carbamate functional groups, such as those described in U.S. Pat. No. 6,165,338.

The anionic salt group-containing film-forming polymer may be present in the anionic electrodepositable coating composition in an amount of at least 50% by weight, such as at least 55% by weight, such as at least 60% by weight, and may be present in an amount of no more than 90% by weight, such as no more than 80% by weight, such as no more than 75% by weight, based on the total weight of the resin solids of the electrodepositable coating composition. The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition.

The ionic salt group-containing film-forming polymer may be present in the electrodepositable coating composition in an amount of at least 40% by weight, such as at least 50% by weight, such as at least 55% by weight, such as at least 60% by weight, based on the total weight of the resin solids of the electrodepositable coating composition. The ionic salt group-containing film-forming polymer may be present in the electrodepositable coating composition in an amount of no more than 90% by weight, such as no more than 80% by weight, such as no more than 75% by weight, based on the total weight of the resin solids of the electrodepositable coating composition. The ionic salt group-containing film-forming polymer may be present in the electrodepositable coating composition in an amount of 40% to 90% by weight, such as 50% to 90% by weight, such as 50% to 80% by weight, such as 55% to 80% by weight, such as 60% to 75% by weight, based on the total weight of the resin solids of the electrodepositable coating composition.

Blocked Polyisocyanate Curing Agent

According to the present invention, the electrodepositable coating composition of the present invention further comprises a blocked polyisocyanate curing agent.

As used herein, a "blocked polyisocyanate" means a polyisocyanate wherein at least a portion of the isocyanato groups is blocked by a blocking group introduced by the reaction of a free isocyanato group of the polyisocyanate with a blocking agent. By "blocked" is meant that the isocyanato groups have been reacted with a blocking agent such that the resultant blocked isocyanate group is stable to active hydrogens at ambient temperature, e.g., room temperature (about 23° C.), but reactive with active hydrogens in the film-forming polymer at elevated temperatures, such as, for example, between 90° C. and 200° C. Therefore, a blocked polyisocyanate curing agent comprises a polyisocyanate reacted with one or more blocking agent(s). As used herein, a "blocking agent" refers to a compound comprising a functional group reactive with an isocyanato group present on the polyisocyanate resulting in binding a residual moiety of the blocking agent to the isocyanato group so that the isocyanato group is stable to active hydrogen functional groups at room temperature (i.e., 23° C.). The bound residual moiety of a blocking agent to the isocyanato group, which provides stability of the isocyanato group towards active hydrogen functional groups at room temperature, is referred to as a "blocking group" herein. Blocking groups may be identified by reference to the blocking agent from which they are derived by reaction with an isocyanato group. Blocking groups may be removed under suitable conditions, such as at elevated temperatures such that free isocyanato groups may be generated from the blocked isocyanato groups. Thus, the reaction with the blocking agent may be reversed at elevated temperature such that the previously blocked isocyanato group is free to react with active hydrogen functional groups. As used herein, the term "derived from" with respect to the blocking group of the blocked polyisocyanate is intended to refer to the presence of the residue of a blocking agent in the blocking group and is not intended to be limited to a blocking group produced by reaction of an isocyanato group of the polyisocyanate with the blocking agent. Accordingly, a blocking group of the present invention resulting from synthetic pathways that do not include direct reaction of the isocyanato group and blocking agent will still be considered to be "derived from" the blocking agent. Accordingly, the term "blocking agent" may also be used to refer to the moiety of the blocked polyisocyanate that leaves a blocking group during cure to produce a free isocyanato group. As used herein, the term "blocked" polyisocyanate curing agent" collectively refers to a fully blocked polyisocyanate curing agent and an at least partially blocked polyisocyanate curing agent. As used herein, a "fully blocked polyisocyanate curing agent" refers to a polyisocyanate wherein each of the isocyanato groups has been blocked with a blocking group. As used herein, an "at least partially blocked polyisocyanate curing agent" refers to a polyisocyanate wherein at least a portion of the isocyanato groups have been blocked with a blocking group while the remaining isocyanato groups have been reacted with a portion of the polymer backbone.

The blocked polyisocyanate curing agent comprises isocyanato groups that are reactive with the reactive groups, such as active hydrogen groups, of the ionic salt group-containing film-forming polymer to effectuate cure of the coating composition to form a coating. As used herein, the term "cure", "cured" or similar terms, as used in connection with the electrodepositable coating compositions described herein, means that at least a portion of the components that form the electrodepositable coating composition are crosslinked to form a coating. Additionally, curing of the electrodepositable coating composition refers to subjecting said composition to curing conditions (e.g., elevated temperature) leading to the unblocking of the blocked isocyanato groups of the blocked polyisocyanate curing agent to result in reaction of the unblocked isocyanato groups of the polyisocyanate curing agent with active hydrogen functional groups of the film-forming polymer, and resulting in the crosslinking of the components of the electrodepositable coating composition and formation of an at least partially cured coating. Blocking agents removed during cure may be removed from the coating film by volatilization. Alternatively, a portion or all of the blocking agent may remain in the coating film following cure.

The polyisocyanates that may be used in preparing the blocked polyisocyanate curing agent of the present invention include any suitable polyisocyanate known in the art. A polyisocyanate is an organic compound comprising at least two, at least three, at least four, or more isocyanato functional groups, such as two, three, four, or more isocyanato functional groups. For example, the polyisocyanate may comprise aliphatic and/or aromatic polyisocyanates. As will be understood, an aromatic polyisocyanate will have a nitrogen atom of an isocyanate group covalently bound to a carbon present in an aromatic group, and an aliphatic polyisocyanate may contain an aromatic group that is indirectly bound to the isocyanato group through a non-aromatic hydrocarbon group. Aliphatic polyisocyanates may include, for example, (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexamethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include, for example, (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane diisocyanate ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4,4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The blocked polyisocyanate curing agent may also comprise a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

As discussed above, the isocyanato groups of the polyisocyanate are blocked with a blocking agent such that the blocked polyisocyanate curing agent comprises blocking groups. The blocking groups may be formed by reacting the isocyanato groups with a molar ratio of blocking agents. For example, the isocyanato groups may be reacted with a 1:1 molar ratio of isocyanato groups to blocking agents such that the isocyanato groups are theoretically 100% blocked with the blocking agents. Alternatively, the molar ratio of isocyanato groups to blocking agents may be such that the isocyanato groups or blocking agent is in excess. The blocking group itself is a urethane group that contains the residues of the isocyanato group and a functional group of the blocking agent.

According to the present invention, the blocking agent may comprise a 1,2-polyol. The 1,2-polyol will react with an isocyanato group of the polyisocyanate to form a blocking group. The 1,2-polyol may comprise at least 30%, such as at least 35%, such as at least 40%, such as at least 45%, such as at least 50%, such as at least 55%, such as at least 60%, such as at least 65%, such as at least 70%, such as at least 75%, such as at least 80%, such as at least 85%, such as at least 90%, such as at least 95%, such as at least 99%, such as 100%, based upon the total number of blocking groups. The 1,2-polyol may comprise no more than 100% of the blocking groups of the blocked polyisocyanate curing agent, such as no more than 99%, such as no more than 95%, such as no more than 90%, such as no more than 85%, such as no more than 80%, such as no more than 75%, such as no more than 70%, such as no more than 65%, such as no more than 60%, such as no more than 55%, such as no more than 50%, such as no more than 45%, such as no more than 40%, such as no more than 35%, such as no more than 30%, based upon the total number of blocking groups. The 1,2-polyol may comprise 30% to 100% of the blocking groups of the blocked polyisocyanate curing agent, such as 30% to 100%, such as 35% to 100%, such as 40% to 100%, such as 45% to 100%, such as 50% to 100%, such as 55% to 100%, such as 60% to 100%, 65% to 100%, such as 70% to 100%, such as 75% to 100%, such as 80% to 100%, 85% to 100%, such as 90% to 100%, such as 95% to 100%, such as 30% to 95%, such as 35% to 95%, such as 40% to 95%, such as 45% to 95%, such as 50% to 95%, such as 55% to 95%, such as 60% to 95%, 65% to 95%, such as 70% to 95%, such as 75% to 95%, such as 80% to 95%, 85% to 95%, such as 90% to 95%, such as 30% to 90%, such as 35% to 90%, such as 40% to 90%, such as 45% to 90%, such as 50% to 90%, such as 55% to 90%, such as 60% to 90%, 65% to 90%, such as 70% to 90%, such as 75% to 90%, such as 80% to 90%, 85% to 90%, such as 30% to 85%, such as 35% to 85%, such as 40% to 85%, such as 45% to 85%, such as 50% to 85%, such as 55% to 85%, such as 60% to 85%, 65% to 85%, such as 70% to 85%, such as 75% to 85%, such as 80% to 85%, such as 30% to 80%, such as 35% to 80%, such as 40% to 80%, such as 45% to 80%, such as 50% to 80%, such as 55% to 80%, such as 60% to 80%, 65% to 80%, such as 70% to 80%, such as 75% to 80%, such as 30% to 75%, such as 35% to 75%, such as 40% to 75%, such as 45% to 75%, such as 50% to 75%, such as 55% to 75%, such as 60% to 75%, 65% to 75%, such as 70% to 75%, such as 30% to 70%, such as 35% to 70%, such as 40% to 70%, such as 45% to 70%, such as 50% to 70%, such as 55% to 70%, such as 60% to 70%, 65% to 70%, such as 30% to 65%, such as 35% to 65%, such as 40% to 65%, such as 45% to 65%, such as 50% to 65%, such as 55% to 65%, such as 60% to 65%, such as 30% to 60%, such as 35% to 60%, such as 40% to 60%, such as 45% to 60%, such as 50% to 60%, such as 55% to 60%, such as 30% to 55%, such as 35% to 55%, such as 40% to 55%, such as 45% to 55%, such as 50% to 55%, such as 30% to 50%, such as 35% to 50%, such as 40% to 50%, such as 45% to 50%, such as 30% to 45%, such as 35% to 45%, such as 40% to 45%, such as 30% to 40%, such as 35% to 40%, such as 30% to 35%, based upon the total number of blocking groups. As used herein, the percentage of blocking groups of the blocked polyisocyanate curing agent with respect to a blocking agent refers to the molar percentage of isocyanato groups blocked by that blocking agent divided by the total number of isocyanato groups actually blocked, i.e., the total number of blocking groups. The percentage of blocking groups may be determined by dividing the total moles of blocking groups blocked with a specific blocking agent by the total moles of blocking groups of the blocked polyisocyanate curing agent and multiplying by 100. It may also be expressed in equivalents of the blocking agent to total equivalents of isocyanato groups from the polyisocyanate, and the percentages and equivalents may be converted and used interchangeably (e.g., 40% of the total blocking groups is the same as 4/10 equivalents). For clarity, when reference is made to blocking groups, blocked with a blocking agent, the blocking group does not need to be derived strictly from reaction of the isocyanato group with the blocking agent and may be made by any synthetic pathway, as discussed below.

The 1,2-polyol may comprise a 1,2-alkane diol. Non-limiting examples of the 1,2-alkane diol include ethylene glycol, propylene glycol, 1,2-butane diol, 1,2-pentane diol, 1,2-hexane diol, 1,2-heptanediol, 1,2-octanediol, glycerol ethers or esters having vicinal hydroxyl functional groups, and the like, and may include combinations thereof.

As discussed above, the isocyanato groups of the polyisocyanate are blocked with a blocking agent such that the blocked polyisocyanate curing agent comprises blocking groups to produce a urethane-containing compound. Accordingly, the blocked polyisocyanate curing agent may be referred to by the resulting structure that occurs after reaction of the isocyanato group and blocking agent, and the blocked polyisocyanate curing agent may comprise the structure:

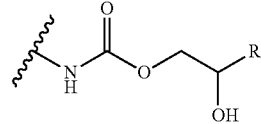

wherein R is hydrogen or a substituted or unsubstituted alkyl group comprising 1 to 8 carbon atoms, such as 1 to 6 carbon atoms, and wherein the substituted alkyl group optionally comprises an ether or ester functional group.

Although the blocked polyisocyanate curing agent is generally disclosed as being produced by reaction of the isocyanato group and blocking agent, it should be understood that any synthetic pathway that would produce the blocked polyisocyanate curing agent of the structure above could be used to produce the blocked polyisocyanate curing agent of the present invention.

In addition, or as an alternative, to the 1,2-polyol, the blocked polyisocyanate may optionally further comprise (as a co-blocking agent with the 1,2-polyol or as alternative blocking agents) any suitable blocking agent. The blocking agent may comprise aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime. Other co-blocking agents include a 1,3-alkane diol, such as, for example, 1,3-butanediol; a benzylic alcohol, for example, benzyl alcohol; an allylic alcohol, for example, allyl alcohol; caprolactam; a dialkylamine, for example dibutylamine; other diol, triol, or polyols; and mixtures thereof.

When present as a co-blocking agent to the 1,2-polyol, the co-blocking agent may comprise at least 1% of the blocking groups of the blocked polyisocyanate curing agent, such as at least 5%, such as at least 10%, such as at least 15%, such as at least 20%, such as at least 25%, such as at least 30%, such as at least 45%, such as at least 50%, such as at least 55%, such as at least 60%, such as at least 65%, such as 70%, based upon the total number of blocking groups. The co-blocking agent may comprise no more than 70%, such as no more than 65%, such as no more than 60%, such as no more than 55%, such as no more than 50%, such as no more than 45%, such as no more than 40%, such as no more than 35%, such as no more than 30%, such as no more than 25%, such as no more than 20%, such as no more than 15%, such as no more than 10%, such as no more than 5%, such as no more than 1%, based upon the total number of blocking groups. The co-blocking agent may comprise 1% to 70%, such as 5% to 70%, such as 10% to 70%, such as 15% to 70%, such as 20% to 70%, such as 25% to 70%, such as 30% to 70%, such as 35% to 70%, such as 40% to 70%, such as 45% to 70%, such as 50% to 70%, such as 55% to 70%, such as 60% to 70%, such as 65% to 70%, such as 1% to 65%, such as 5% to 65%, such as 10% to 65%, such as 15% to 65%, such as 20% to 65%, such as 25% to 65%, such as 30% to 65%, such as 35% to 65%, such as 40% to 65%, such as 45% to 65%, such as 50% to 65%, such as 55% to 65%, such as 60% to 65%, such as 1% to 60%, such as 5% to 60%, such as 10% to 60%, such as 15% to 60%, such as 20% to 60%, such as 25% to 60%, such as 30% to 60%, such as 35% to 60%, such as 40% to 60%, such as 45% to 60%, such as 50% to 60%, such as 55% to 60%, such as 1% to 55%, such as 5% to 55%, such as 10% to 55%, such as 15% to 55%, such as 20% to 55%, such as 25% to 55%, such as 30% to 55%, such as 35% to 55%, such as 40% to 55%, such as 45% to 55%, such as 50% to 55%, such as 1% to 50%, such as 5% to 50%, such as 10% to 50%, such as 15% to 50%, such as 20% to 50%, such as 25% to 50%, such as 30% to 50%, such as 35% to 50%, such as 40% to 50%, such as 45% to 50%, such as 1% to 45%, such as 5% to 45%, such as 10% to 45%, such as 15% to 45%, such as 20% to 45%, such as 25% to 45%, such as 30% to 45%, such as 35% to 45%, such as 40% to 45%, such as 1% to 40%, such as 5% to 40%, such as 10% to 40%, such as 15% to 40%, such as 20% to 40%, such as 25% to 40%, such as 30% to 40%, such as 35% to 40%, such as 1% to 35%, such as 5% to 35%, such as 10% to 35%, such as 15% to 35%, such as 20% to 35%, such as 25% to 35%, such as 30% to 35%, such as 1% to 30%, such as 5% to 30%, such as 10% to 30%, such as 15% to 30%, such as 20% to 30%, such as 25% to 30%, such as 1% to 25%, such as 5% to 25%, such as 10% to 25%, such as 15% to 25%, such as 20% to 25%, such as 1% to 20%, such as 5% to 20%, such as 10% to 20%, such as 15% to 20%, such as 1% to 15%, such as 5% to 15%, such as 10% to 15%, such as 1% to 10%, such as 5% to 10%, such as 1% to 5%, based upon the total number of blocking groups.

The blocking agent may comprise an ether or polyether comprising a hydroxyl group and a terminal group having the structure —O—R, wherein R is a $C_1$ to $C_4$ alkyl group, such as a $C_1$ to $C_3$ alkyl group, or two terminal hydroxyl groups. The polyether may comprise a homopolymer, block copolymer, or random copolymer. For example, the polyether may comprise a homopolymer of ethylene oxide or propylene oxide, or the polyether may comprise block or random copolymer comprising a combination of ethylene oxide and propylene oxide in a block or random pattern. Such organic solvents may comprise the structure. Such blocking groups may comprise the structure:

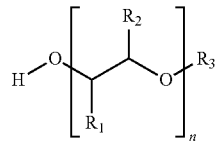

wherein $R_1$ and $R_2$ are each hydrogen or one of the $R_1$ and $R_2$ is hydrogen and the other is a methyl group; $R_3$ is H or a $C_1$ to $C_4$ alkyl group, such as a $C_1$ to $C_3$ alkyl group; and n is an integer from 1-50, such as from 1-40, such as from 1-30, such as from 1-20, such as from 1-12, such as from 1-8, such as from 1-6, such as from 1-4, such as from 2-50, such as from 2-40, such as from 2-30, such as from 2-20, such as from 2-12, such as from 2-8, such as from 2-6, such as from 2-4, such as from 3-50, such as from 3-40, such as from 3-30, such as from 3-20, such as from 3-12, such as from 3-8, such as from 3-6, such as from 3-4.

The curing agent may optionally comprise a high molecular weight volatile group. As used herein, the term "high molecular weight volatile group" refers to blocking agents and other organic byproducts that are produced and volatilized during the curing reaction of the electrodepositable coating composition having a molecular weight of at least 70 g/mol, such as at least 125 g/mol, such as at least 160 g/mol, such as at least 195 g/mol, such as at least 400 g/mol, such as at least 700 g/mol, such as at least 1000 g/mol, or higher, and may range from 70 to 1,000 g/mol, such as 160 to 1,000 g/mol, such as 195 to 1,000 g/mol, such as 400 to 1,000 g/mol, such as 700 to 1,000 g/mol. For example, the organic byproducts may include alcoholic byproducts resulting from the reaction of the film-forming polymer and an aminoplast or phenoplast curing agent, and the blocking agents may include organic compounds, including alcohols, used to block isocyanato groups of polyisocyanates that are unblocked during cure. For clarity, the high molecular weight volatile groups are covalently bound to the curing agent prior to cure, and explicitly exclude any organic solvents that may be present in the electrodepositable coating composition. Upon curing, the pigment-to-binder ratio of the deposited film may increase in the cured film relative to deposited uncured pigment-to-binder ratio in the electrodepositable coating composition because of the loss of a higher mass of the blocking agents and other organic byproducts derived from the curing agent that are volatilized during cure. High molecular weight volatile groups may comprise 5% to 50% by weight of the film-forming binder, such as 7% to 45% by weight, such as 9% to 40% by weight, such as 11% to 35%, such as 13% to 30%, based on the total weight of the film-forming binder. The high molecular weight volatile groups and other lower molecular weight volatile organic compounds produced during cure, such as lower molecular weight blocking agents and organic byproducts produced during cure, may be present in an amount such that the relative weight loss of the film-forming binder deposited onto the substrate relative to the weight of the film-forming binder after cure is an amount of 5% to 50% by weight of the film-forming binder, such as 7% to 45% by weight, such as 9% to 40% by weight, such as 11% to 35%, such as 13% to 30%, based on the total weight of the film-forming binder before and after cure.

The blocked polyisocyanate curing agent may be substantially free, essentially free, or completely free of blocking groups comprising a polyester diol blocking agent formed from the reaction of ethylene glycol, propylene glycol, or 1,4-butanediol with oxalic acid, succinic acid, adipic acid, suberic acid, or sebacic acid. The blocked polyisocyanate is substantially free of blocking groups comprising a polyester diol if such groups are present in an amount of 3% or less, based upon the total number of blocking groups. The blocked polyisocyanate is essentially free of blocking groups comprising a polyester diol if such groups are present in an amount of 1% or less, based upon the total number of blocking groups. The blocked polyisocyanate is completely free of blocking groups comprising a polyester diol is such groups are not present, i.e., 0%, based upon the total number of blocking groups.

The curing agent may be present in the cationic electrodepositable coating composition in an amount of at least 10% by weight, such as at least 20% by weight, such as at least 25% by weight and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition.

The curing agent may be present in the anionic electrodepositable coating composition in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

Bismuth Catalyst

According to the present invention, the electrodepositable coating composition of the present invention comprises a bismuth catalyst.

As used herein, the term "bismuth catalyst" refers to catalysts that contain bismuth and catalyze transurethanation reactions, and specifically catalyze the deblocking of the blocked polyisocyanate curing agent blocking groups.

The bismuth catalyst may comprise a soluble bismuth catalyst. As used herein, a "soluble" or "solubilized" bismuth catalyst is at catalyst wherein at least a portion of the bismuth metal from the bismuth dissolves into an aqueous medium having a pH in the range of 4 to 7 at room temperature (e.g., 23° C.), such as, for example, at least 10% of the bismuth catalyst, such as at least 20% of the bismuth catalyst, such as at least 30% of the bismuth catalyst, such as at least 35% of the bismuth catalyst, such as at least 40% of the bismuth catalyst, such as at least 45% of the bismuth catalyst, such as at least 50% of the bismuth catalyst. The percentage of solubilized bismuth present in the composition may be determined using ICP-MS to calculate the total amount of bismuth (i.e., soluble and insoluble) and total amount of solubilized bismuth and calculating the percentage using those measurements.

The bismuth catalyst may be present in an amount such that the amount of solubilized bismuth metal may be at least 0.04% by weight, based on the total weight of the electrodepositable coating composition, such as at least 0.06% by weight, such as at least 0.07% by weight, such as at least 0.08% by weight, such as at least 0.09% by weight, such as at least 0.10% by weight, such as at least 0.11% by weight, such as at least 0.12% by weight, such as at least 0.13% by weight, such as at least 0.14% by weight, or higher.

The bismuth catalyst may be present in an amount such that the amount of solubilized bismuth metal may be at least 0.22% by weight, based on the total weight of the resin solids, such as at least 0.30% by weight, such as at least 0.34% by weight, such at least 0.40% by weight, such as at least 0.45% by weight, such as 0.51% by weight, such as at least 0.56% by weight, such as at least 0.62% by weight, such as at least 0.68% by weight, such as at least 0.73% by weight, such as at least 0.80% by weight, or higher.

The amount of total amount of bismuth metal introduced into the composition from the bismuth catalyst is not limited but may be up to 30,000 ppm or higher. The composition may include at least 10 ppm soluble bismuth metal, such as at least 100 ppm soluble bismuth metal, such as at least 150 ppm soluble bismuth metal, such as at least 200 ppm soluble bismuth metal, such as at least 300 ppm soluble bismuth metal, such as at least 500 ppm soluble bismuth metal, such as at least 1,000 ppm soluble bismuth metal, such as at least 3,000 ppm soluble bismuth metal, such as at least 5,000 ppm soluble bismuth metal, such as at least 10,000 ppm soluble bismuth metal, such as at least 15,000 ppm soluble bismuth metal. The composition may include no more than 20,000 ppm soluble bismuth metal, such as no more than 15,000 ppm soluble bismuth metal, such as no more than 10,000 ppm soluble bismuth metal, such as no more than 5,000 ppm soluble bismuth metal, such as no more than 3,000 ppm soluble bismuth metal, such as no more than 1,000 ppm soluble bismuth metal, such as no more than 800 ppm soluble bismuth metal, such as no more than 600 ppm soluble bismuth metal, such as no more than 500 ppm, such as no more than 400 ppm. The composition may include 10 to 20,000 ppm soluble bismuth metal, such as 100 to 20,000 ppm soluble bismuth metal, such as 150 to 15,000 ppm soluble bismuth metal, such as 200 to 10,000 ppm soluble bismuth metal, such as 300 to 5,000 ppm soluble bismuth metal, such as 500 to 3,000 ppm soluble bismuth metal, such as 10 to 1,000 ppm soluble bismuth metal, such as 100 to 1,000 ppm soluble bismuth metal, such as 100 to 800 ppm soluble bismuth metal, such as 100 to 600 ppm soluble bismuth metal, such as 100 to 500 ppm soluble bismuth metal, such as 100 to 400 ppm soluble bismuth metal, such as 150 to 1,000 ppm soluble bismuth metal soluble bismuth metal, such as 150 to 800 ppm soluble bismuth metal, such as 150 to 600 ppm soluble bismuth metal, such as 150 to 500 ppm soluble bismuth metal, such as 150 to 400 ppm soluble bismuth metal.

The bismuth catalyst may comprise a bismuth compound and/or complex.

The bismuth catalyst may, for example, comprise a colloidal bismuth oxide or bismuth hydroxide, a bismuth compound complex such as, for example, a bismuth chelate complex, or a bismuth salt of an inorganic or organic acid, wherein the term "bismuth salt" includes not only salts comprising bismuth cations and acid anions, but also bismuthoxy salts.

Examples of inorganic or organic acids from which the bismuth salts may be derived are hydrochloric acid, nitric acid, sulphuric acid, inorganic or organic sulphonic acids, carboxylic acids, for example, formic acid or acetic acid, amino carboxylic acids and hydroxy carboxylic acids, such as lactic acid or dimethylolpropionic acid.

Non-limiting examples of bismuth salts are aliphatic hydroxycarboxylic acid salts of bismuth, such as lactic acid salts or dimethylolpropionic acid salts of bismuth, for example, bismuth lactate or bismuth dimethylolpropionate; amidosulphonic acid salts of bismuth; hydrocarbylsulphonic acid salts of bismuth, such as alkyl sulphonic acid salts, including methane sulphonic acid salts of bismuth, for example, bismuth methane sulphonate. Further non-limiting examples of bismuth compound or complex catalysts include bismuth oxides, bismuth carboxylates, bismuth subnitrate, bismuth sulfamate, bismuth sulphonate, and combinations thereof.

The bismuth catalyst may be present in an amount of at least 0.01% by weight of bismuth metal, such as at least 0.1% by weight, such as at least 0.2% by weight, such as at least 0.5% by weight, such as at least 1% by weight, such as 1% by weight, based on the total resin solids weight of the composition. The bismuth catalyst may be present in an amount of no more than 3% by weight of bismuth metal, such as no more than 1.5% by weight, such as no more than 1% by weight, based on the total resin solids weight of the composition. The bismuth catalyst may be present in an amount of 0.01% to 3% by weight of bismuth metal, such as 0.1% to 1.5% by weight, such as 0.2% to 1% by weight, such as 0.5% to 3% by weight, such as 0.5% to 1.5% by weight, such as 0.5% to 1% by weight, such as 1% to 3% by weight, such as 1% to 1.5% by weight, based on the total resin solids weight of the composition.

Guanidine

According to the present invention, the electrodepositable coating composition further comprises a guanidine. It will be understood that "guanidine," as used herein, refers to guanidine and derivatives thereof. For example, the guanidine may comprise a compound, moiety, and/or residue having the following general structure:

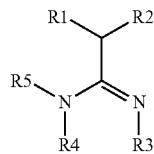

(II)

wherein each of R1, R2, R3, R4, and R5 (i.e., substituents of structure (II)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group" it is meant that any two adjacent R groups are connected to form a cyclic moiety, such as the rings in structures (III)-(VI) below.

It will be appreciated that the double bond between the carbon atom and the nitrogen atom that is depicted in structure (II) may be located between the carbon atom and another nitrogen atom of structure (II). Accordingly, the various substituents of structure (II) may be attached to different nitrogen atoms depending on where the double bond is located within the structure.

The guanidine may comprise a cyclic guanidine such as a guanidine of structure (II) wherein two or more R groups of structure (II) together form one or more rings. In other words, the cyclic guanidine may comprise ≥1 ring(s). For example, the cyclic guanidine may either be a monocyclic guanidine (1 ring) such as depicted in structures (III) and (IV) below, or the cyclic guanidine may be bicyclic or polycyclic guanidine (≥2 rings) such as depicted in structures (V) and (VI) below.

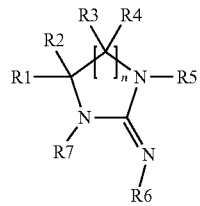

(III)

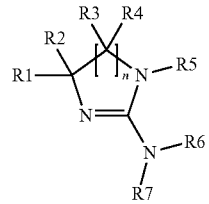

(IV)

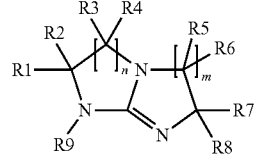

(V)

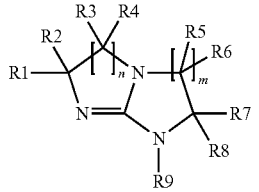

(VI)

Each substituent of structures (III) and/or (IV), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of structures (V) and (VI), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of structures (III) and/or (IV), certain combinations of R1-R7 may be part of the same ring structure. For example, R1 and R7 of structure (III) may form part of a single ring structure. Moreover, it will be understood that any combination of substituents (R1-R7 of structures (III) and/or (IV) as well as R1-R9 of structures (V) and/or (VI)) may be chosen so long as the substituents do not substantially interfere with the catalytic activity of the cyclic guanidine.

Each ring in the cyclic guanidine may be comprised of ≥5 members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in structures (III)-(VI)), a 6-member ring will have 6 atoms in the ring structure ("n" and/or "m"=2 in structures (III)-(VI)), and a 7-member ring will have 7 atoms in the ring structure ("n" and/or "m"=3 in structures (III)-(VI)). It will be appreciated that if the cyclic guanidine is comprised of ≥2 rings (e.g., structures (V) and (VI)), the number of members in each ring of the cyclic guanidine can either be the same or different. For example, one ring may be a five-member ring while the other ring may be a six-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of structures (III)-(VI) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of structures (III) and/or (IV) and/or R9 of structures (V) and/or (VI) is not hydrogen. As used herein in conjunction with the cyclic guanidine, the term "unsubstituted" refers to a cyclic guanidine wherein R1-R7 of structures (III) and/or (IV) and/or R1-R9 of structures (V) and/or (VI) are hydrogen.

The cyclic guanidine may comprise a bicyclic guanidine, and the bicyclic guanidine may comprise 1,5,7-triazabicyclo[4.4.0]dec-5-ene ("TBD" or "BCG").

The guanidine is present in the electrodepositable coating composition such that a weight ratio of bismuth metal from the solubilized bismuth catalyst to guanidine of from 1.00:0.071 to 1.0:2.1, such as from 1.0:0.17 to 1.0:2.0, such as from 1.0:0.33 to 1.0:1.33, such as from 1.0:0.47 to 1.0:1.0.

The guanidine is present in the electrodepositable coating composition such that a molar ratio of bismuth metal to guanidine of from 1.0:0.25 to 1.0:3.0, such as from 1:0.5 to 1.0:2.0, such as from 1:0.7 to 1:1.5.

It has been surprisingly discovered that the addition of a guanidine to a bismuth-catalyzed electrodepositable coating composition allows for the production of an electrodepositable coating composition that maintains cure even as the concentration of phosphate ions increases. Sufficient cure performance may be maintained despite phosphate ions present in the electrodepositable coating composition. For example, the electrodepositable coating composition may achieve cure with phosphate ions present in the electrodepositable coating composition in an amount of 1 to 1,000 ppm, such as 1 to 800 ppm, such as 1 to 500 ppm, such as 1 to 300 ppm, such as 1 to 200 ppm, such as 100 to 1,000 ppm, such as 100 to 800 ppm, such as 100 to 500 ppm, such as 100 to 300 ppm, such as 100 to 200 ppm, such as 200 to 1,000 ppm, such as 200 to 800 ppm, such as 200 to 500 ppm, such as 200 to 300 ppm, such as 300 to 1,000 ppm, such as 300 to 800 ppm, such as 300 to 500 ppm.

As discussed above, the electrodepositable coating composition may include phosphate ions. As used herein, "phosphate ions" refers to anions derived from phosphoric acid having the general chemical formula $[PO_4]^{3-}$, $[HPO_4]^{2-}$, and/or $[H_2PO_4]^{-}$. Although reference herein is to "phosphate" ions, derivatives of other phosphorus acid derivatives are within the scope of the invention. Accordingly, unless specified otherwise, the phosphate ions may refer to phosphonate anions derived from phosphonic acid having the general chemical formula $[RPO_3]^{2-}$ and/or $[RHPO_3]^{1-}$, and phosphinate anions derived from phosphinic acid.

According to the present invention, the electrodepositable coating composition includes a source of phosphate ions. The source of phosphate ions may be added intentionally or unintentionally to the electrodepositable coating composition. For example, as discussed above, phosphate ions may be carried into the bath by the substrate to be coated during a coating process that includes a metal phosphate pretreatment application or other phosphate-containing composition application (e.g., acid pickling, etc.) prior to electrocoating. Residual phosphate from the pretreatment composition still present on the surface of the substrate may solubilize and remain in the electrodepositable coating composition bath. The concentration of phosphate ions brought into the bath in this manner may increase over time as more substrates are coated. Alternatively, the phosphate ions may be intentionally added to the electrodepositable coating composition as, for example, a dispersing acid for a pigment. As demonstrated in the Examples section below, addition of a guanidine may help maintain cure performance at high levels of phosphate ions that would otherwise disrupt cure of the electrodepositable coating composition.

Further Components of the Electrodepositable Coating Compositions

The electrodepositable coating composition according to the present invention may optionally comprise one or more further components in addition to the ionic salt group-containing film-forming polymer, the blocked polyisocyanate curing agent, the bismuth catalyst, and the guanidine described above.

According to the present invention, the cationic electrodepositable coating composition of the present invention may further comprise a pigment and a dispersing acid.

The pigment may comprise a phyllosilicate pigment. As used herein, the term "phyllosilicate" refers to a group of minerals having sheets of silicates having a basic structure based on interconnected six membered rings of $SiO_4^{-4}$ tetrahedra that extend outward in infinite sheets where 3 out of the 4 oxygens from each tetrahedra are shared with other tetrahedra resulting in phyllosilicates having the basic structural unit of $Si_2O_5^{-2}$. Phyllosilicates may comprise hydroxide ions located at the center of the tetrahedra and/or cations such as, for example, $Fe^{+2}$, $Mg^{+2}$, or $Al^{+3}$, that form cation layers between the silicate sheets where the cations may coordinate with the oxygen of the silicate layer and/or the hydroxide ions. The term "phyllosilicate pigment" refers to pigment materials comprising phyllosilicates. Non-limiting examples of phyllosilicate pigments includes the micas, chlorites, serpentine, talc, and the clay minerals. The clay minerals include, for example, kaolin clay and smectite clay. The sheet-like structure of the phyllosilicate pigment tends to result in pigment having a plate-like structure, although the pigment can be manipulated (such as through mechanical means) to have other particle structures. These pigments when exposed to liquid media may or may not swell and may or may not have leachable components (e.g.: ions that may be drawn towards, and carried away in, the liquid media).

The phyllosilicate pigment may comprise a plate-like pigment. For example, the phyllosilicate pigment may comprise a plate-like mica pigment, a plate-like chlorite pigment, a plate-like serpentine pigment, a plate-like talc pigment, and/or a plate-like clay pigment. The plate-like clay pigment may comprise kaolin clay, smectite clay, or a combination thereof.

As used herein, the term "dispersing acid" refers to a material capable of forming a chemical complex with the phyllosilicate pigment and may assist in promoting dispersion of the phyllosilicate pigment.

The phyllosilicate pigment and dispersing acid may optionally form a complex, and the phyllosilicate pigment-dispersing acid complex of the present invention may optionally have an overall anionic charge. As used herein, the term "complex" refers to a substance formed by the chemical interaction, such as ionic bonding, covalent bonding, and/or hydrogen bonding, between two distinct chemical species. As used herein, the term "overall anionic charge" with respect to the complex means that the complex is at least partially negatively charged and may have some portions positively charged, but the negative charges are greater than the positive charges such that the complex has an anionic charged. These species will generally be part of a dispersion phase having one component or multiple components that is not soluble in the bulk media and other component(s) that are soluble in the bulk material.

The dispersing acid may be a monoprotic acid or polyprotic acid. As used herein, the term "polyprotic acid" refers to chemical compounds having more than one acidic proton. As used herein, the term "acidic proton" refers to a proton that forms part of an acid group, including, but not limited to, oxyacids of phosphorus, carboxylic acids, oxyacids of sulfur, and the like.

The dispersing acid may comprise a first acidic proton having a pKa of at least 1.1, such as at least 1.5, such as at least 1.8. The dispersing acid may comprise a first acidic proton having a pKa of no more than 4.6, such as no more than 4.0, such as no more than 3.5. The dispersing acid may comprise a first acidic proton having a pKa of 1.1 to 4.6, such as 1.5 to 4.0, such as 1.8 to 3.5.

The dispersing acid may comprise a carboxylic acid, an oxyacid of phosphorus (such as phosphoric acid or phosphonic acid), or a combination thereof.

The dispersing acid may form a complex with the phyllosilicate pigment, and the phyllosilicate pigment-dispersing acid complex may comprise a phyllosilicate pigment-dispersing acid complex. The dispersing acid may deprotonate in the aqueous medium of the composition to form a negative (or more negative) charge, and the deprotonated acid dispersant may form a complex with the positively charged edges of the plate-like phyllosilicate pigment. The complex optionally may have an overall more negative charge than the phyllosilicate pigment does itself, i.e., the phyllosilicate pigment-dispersing acid complex may have an overall anionic charge.

The ratio of the weight of phyllosilicate pigment to moles of dispersing acid may be at least 0.25 g/mmol, such as at least 0.5 g/mmol, such as at least 1.0 g/mmol, such as at least 1.5 g/mmol, such as at least 1.75 g/mmol. The ratio of the weight of phyllosilicate pigment to moles of dispersing acid may be no more than 196 g/mmol, such as no more than 100 g/mmol, such as no more than 50 g/mmol, such as no more than 25 g/mmol, such as no more than 15 g/mmol, such as no more than 10 g/mmol, such as no more than 8.25 g/mmol, such as no more than 6.5 g/mmol, such as no more than 5.0 g/mmol. The ratio of the weight of phyllosilicate pigment to moles of dispersing acid may be in the amount of 0.25 to 196 g/mmol, such as 0.25 to 100 g/mmol, such as 0.25 to 50 g/mmol, such as 0.25 to 25 g/mmol, such as 0.25 to 15 g/mmol, such as 0.25 to 10 g/mmol, such as 0.25 to 8.25 g/mmol, such as 0.25 to 6.5 g/mmol, such as 0.25 to 5.0 g/mmol, such as 0.5 to 196 g/mmol, such as 0.5 to 100 g/mmol, such as 0.5 to 50 g/mmol, such as 0.5 to 25 g/mmol, such as 0.5 to 15 g/mmol, such as 0.5 to 10 g/mmol, such as 0.5 to 8.25 g/mmol, such as 0.5 to 6.5 g/mmol, such as 0.5 to 5.0 g/mmol, such as 1.0 to 196 g/mmol, such as 1.0 to 100 g/mmol, such as 1.0 to 50 g/mmol, such as 1.0 to 25 g/mmol, such as 1.0 to 15 g/mmol, such as 1.0 to 10 g/mmol, such as 1.0 to 8.25 g/mmol, such as 1.0 to 6.5 g/mmol, such as 1.0 to 5.0 g/mmol, such as 1.5 to 196 g/mmol, such as 1.5 to 100 g/mmol, such as 1.5 to 50 g/mmol, such as 1.5 to 25 g/mmol, such as 1.5 to 15 g/mmol, such as 1.5 to 10 g/mmol, such as 1.5 to 8.25 g/mmol, such as 1.5 to 6.5 g/mmol, such as 1.5 to 5.0 g/mmol, such as 1.75 to 196 g/mmol, such as 1.75 to 100 g/mmol, such as 1.75 to 50 g/mmol, such as 1.75 to 25 g/mmol, such as 1.75 to 15 g/mmol, such as 1.75 to 10 g/mmol, such as 1.75 to 8.25 g/mmol, such as 1.75 to 6.5 g/mmol, such as 1.75 to 5.0 g/mmol.

The pigment-to-binder (P:B) ratio as set forth in this invention may refer to the weight ratio of the pigment-to-binder in the electrocoat bath composition, and/or the weight ratio of the pigment-to-binder in the deposited wet film, and/or the weight ratio of the pigment to the binder in the dry, uncured deposited film, and/or the weight ratio of the pigment-to-binder in the cured film. The pigment-to-binder (P:B) ratio of the phyllosilicate pigment to the cationic electrodepositable binder may be at least 0.20:1, such as at least 0.25:1, such as at least 0.30:1, such as at least 0.35:1, such as at least 0.40:1, such as at least 0.50:1, such as at least 0.60:1, such as at least 0.75:1, such as at least 1:1, such as at least 1.25:1, such as at least 1.5:1. The pigment-to-binder (P:B) ratio of the phyllosilicate pigment to the cationic electrodepositable binder may be no more than 2.0:1, such as no more than 1.75:1, such no more than 1.5:1, such as no more than 1.25:1, such as no more than 1:1, such as no more than 0.75:1, such as no more than 0.70:1, such as no more than 0.60:1, such as no more than 0.55:1, such as no more than 0.50:1. The pigment-to-binder (P:B) ratio of the phyllosilicate pigment to the cationic electrodepositable binder may be 0.2:1 to 2.0:1, such as 0.2:1 to 1.75:1, such as 0.2:1 to 1.50:1, such as 0.2:1 to 1.25:1, such as 0.2:1 to 1:1, such as 0.2:1 to 0.75:1, such as 0.2:1 to 0.70:1, such as 0.2:1 to 0.60:1, such as 0.2:1 to 0.55:1, such as 0.2:1 to 0.50:1, such as 0.25:1 to 2.0:1, such as 0.25:1 to 1.75:1, such as 0.25:1 to 1.50:1, such as 0.25:1 to 1.25:1, such as 0.25:1 to 1:1, such as 0.25:1 to 0.75:1, such as 0.25:1 to 0.70:1, such as 0.25:1 to 0.60:1, such as 0.25:1 to 0.55:1, such as 0.25:1 to 0.50:1, such as 0.3:1 to 2.0:1, such as 0.3:1 to 1.75:1, such as 0.3:1 to 1.50:1, such as 0.3:1 to 1.25:1, such as 0.3:1 to 1:1, such as 0.3:1 to 0.75:1, such as 0.3:1 to 0.70:1, such as 0.3:1 to 0.60:1, such as 0.3:1 to 0.55:1, such as 0.3:1 to 0.50:1, such as 0.35:1 to 2.0:1, such as 0.35:1 to 1.75:1, such as 0.35:1 to 1.50:1, such as 0.35:1 to 1.25:1, such as 0.35:1 to 1:1, such as 0.35:1 to 0.75:1, such as 0.35:1 to 0.70:1, such as 0.35:1 to 0.60:1, such as 0.35:1 to 0.55:1, such as 0.35:1 to 0.50:1, such as 0.4:1 to 2.0:1, such as 0.4:1 to 1.75:1, such as 0.4:1 to 1.50:1, such as 0.4:1 to 1.25:1, such as 0.4:1 to 1:1, such as 0.4:1 to 0.75:1, such as 0.4:1 to 0.70:1, such as 0.4:1 to 0.60:1, such as 0.4:1 to 0.55:1, such as 0.4:1 to 0.50:1, such as 0.5:1 to 2.0:1, such as 0.5:1 to 1.75:1, such as 0.5:1 to 1.50:1, such as 0.5:1 to 1.25:1, such as 0.5:1 to 1:1, such as 0.5:1 to 0.75:1, such as 0.5:1 to 0.70:1, such as 0.5:1 to 0.60:1, such as 0.5:1 to 0.55:1, such as 0.6:1 to 2.0:1, such as 0.6:1 to 1.75:1, such as 0.6:1 to 1.50:1, such as 0.6:1 to 1.25:1, such as 0.6:1 to 1:1, such as 0.6:1 to 0.75:1, such as 0.6:1 to 0.70:1, such as 0.75:1 to 2.0:1, such as 0.75:1 to 1.75:1, such as 0.75:1 to 1.50:1, such as 0.75:1 to 1.25:1, such as 0.75:1 to 1:1, such as 1:1 to 2.0:1, such as 1:1 to 1.75:1, such as 1:1 to 1.50:1, such as 1:1 to 1.25:1, such as 1.25:1 to 2.0:1, such as 1.25:1 to 1.75:1, such as 1.25:1 to 1.50:1, such as 1.50:1 to 2.0:1, such as 1.50:1 to 1.75:1.

The dispersing acid may be present in an amount of at least 0.1% by weight, such as at least 0.3% by weight, such as at least 0.5% by weight, such as at least 0.7% by weight, such as at least 0.8% by weight, such as 1% by weight, based on the total solids weight of the composition. The dispersing acid may be present in an amount of no more than 10% by weight, such as no more than 7.5% by weight, such as no more than 5% by weight, such as no more than 3% by weight, such as no more than 2% by weight, such as no more than 1.5% by weight, such as no more than 1% by weight, such as no more than 0.8% by weight, based on the total solids weight of the composition. The dispersing acid may be present in an amount of 0.1% to 10% by weight, such as 0.1% to 7.5% by weight, such as 0.1% to 5% by weight, such as 0.1% to 3% by weight, such as 0.1% to 2% by weight, such as 0.1% to 1.5% by weight, such as 0.1% to 1% by weight, such as 0.1% to 0.8% by weight, such as 0.3% to 10% by weight, such as 0.3% to 7.5% by weight, such as 0.3% to 5% by weight, such as 0.3% to 3% by weight, such as 0.3% to 2% by weight, such as 0.3% to 1.5% by weight, such as 0.3% to 1% by weight, such as 0.3% to 0.8% by weight, such as 0.5% to 10% by weight, such as 0.5% to 7.5% by weight, such as 0.5% to 5% by weight, such as 0.5% to 3% by weight, such as 0.5% to 2% by weight, such as 0.5% to 1.5% by weight, such as 0.5% to 1% by weight, such as 0.5% to 0.8% by weight, such as 0.7% to 10% by weight, such as 0.7% to 7.5% by weight, such as 0.7% to 5% by weight, such as 0.7% to 3% by weight, such as 0.7% to 2% by weight, such as 0.7% to 1.5% by weight, such as 0.7% to 1% by weight, such as 0.7% to 0.8% by weight, such as 0.8% to 10% by weight, such as 0.8% to 7.5% by weight, such as 0.8% to 5% by weight, such as 0.8% to 3% by weight, such as 0.8% to 2% by weight, such as 0.8% to 1.5% by weight, such as 0.8% to 1% by weight, such as 1% to 10% by weight, such as 1% to 7.5% by weight, such as 1% to 5% by weight, such as 1% to 3% by weight, such as 1% to 2% by weight, such as 1% to 1.5% by weight, such as 1% to 1% by weight, such as 1% to 0.8% by weight, based on the total solids weight of the composition.

The present invention is also directed to a method for making an electrodepositable coating composition comprising an electrodepositable binder, an at least partially water-soluble bismuth catalyst, a guanidine, a pigment, and a phosphorus acid, the method comprising the steps of (1) dispersing the electrodepositable binder, the pigment, and the phosphorus acid in an aqueous medium to form a dispersed mixture; (2) adding the guanidine to the dispersed mixture; and (3) adding the bismuth catalyst to the dispersed mixture, wherein the at least partially water-soluble bismuth metal at least partially solubilizes in the mixture. Dispersing the electrodepositable binder, the pigment, and the phosphorous acid in an aqueous medium to form a dispersed mixture optionally comprises the steps of (a) heating an unneutralized cationic salt forming group-containing, film-forming polymer to an elevated temperature; (b) adding a dispersing acid comprising a phosphorus acid to the unneutralized cationic salt forming group-containing, film-forming polymer with agitation to form a mixture; (c) adding a pigment to the mixture; and (d) dispersing the mixture of the cationic salt forming group-containing, film-forming polymer, the pigment, and dispersing acid into an aqueous medium comprising water and a resin neutralizing acid with agitation, wherein cationic salt forming groups in the cationic salt forming group-containing, film-forming polymer are neutralized by the resin neutralizing acid to form a cationic salt group-containing, film forming polymer.

According to the present invention, the electrodepositable coating composition may optionally comprise a co-catalyst to further catalyze the reaction between the blocked polyisocyanate curing agent and the film-forming polymers. Examples of co-catalysts suitable for cationic electrodepositable coating compositions include, without limitation, organotin compounds (e.g., dibutyltin oxide and dioctyltin oxide) and salts thereof (e.g., dibutyltin diacetate); or other metal oxides (e.g., oxides of cerium and zirconium) and salts thereof. Examples of catalysts suitable for anionic electrodepositable coating compositions include latent acid catalysts, specific examples of which are identified in WO 2007/118024 at and include, but are not limited to, ammonium hexafluoroantimonate, quaternary salts of $SbF_6$ (e.g., NACURE® XC-7231), t-amine salts of $SbF_6$ (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

The co-catalyst may be present in the electrodepositable coating composition in amounts of 0.01% to 3% by weight, based on total weight of the resin solids of the electrodepositable coating composition.

Alternatively, the electrodepositable coating composition may be substantially free, essentially free, or completely free of a co-catalyst. As used herein, an electrodepositable coating composition is "substantially free" of a co-catalyst if the co-catalyst is present, if at all, in an amount less than 0.01% by weight, based on the total resin solids weight of the composition. As used herein, an electrodepositable coating composition is "essentially free" of a co-catalyst if the co-catalyst is present, if at all, in trace or incidental amounts insufficient to affect any properties of the composition, such as, e.g., less than 0.001% by weight, based on the total resin solids weight of the composition. As used herein, an electrodepositable coating composition is "substantially free" of a co-catalyst if the co-catalyst is not present in the composition, i.e., 0.000% by weight, based on the total resin solids weight of the composition.

The electrodepositable coating composition may be substantially free, essentially free, or completely free of catalytic tin. As used herein, an electrodepositable coating composition is "substantially free" of catalytic tin if catalytic tin is present, if at all, in an amount less than 0.01% by weight, based on the total resin solids weight of the composition. As used herein, an electrodepositable coating composition is "essentially free" of catalytic tin if catalytic tin is present, if at all, in trace or incidental amounts insufficient to affect any properties of the composition, such as, e.g., less than 0.001% by weight, based on the total resin solids weight of the composition. As used herein, an electrodepositable coating composition is "completely free" of catalytic tin if catalytic tin is not present in the composition, i.e., 0.000% by weight, based on the total resin solids weight of the composition.

As used herein, the term "catalytic" in reference to a metal refers to metals in a form known to catalyze transurethanation reactions, specifically catalyze the deblocking of the blocked polyisocyanate curing agent blocking groups, and do not include non-catalytic forms of the metal such as metal compounds used as pigments.

The electrodepositable coating composition may be substantially free, essentially free, or completely free of catalytic zinc. As used herein, an electrodepositable coating composition is "substantially free" of catalytic zinc if catalytic zinc is present, if at all, in an amount less than 0.01% by weight, based on the total resin solids weight of the composition. As used herein, an electrodepositable coating composition is "essentially free" of catalytic zinc if catalytic zinc is present, if at all, in trace or incidental amounts insufficient to affect any properties of the composition, such as, e.g., less than 0.001% by weight, based on the total resin solids weight of the composition. As used herein, an electrodepositable coating composition is "completely free" of catalytic zinc if catalytic zinc is not present in the composition, i.e., 0.000% by weight, based on the total resin solids weight of the composition.

The electrodepositable coating composition may be substantially free, essentially free, or completely free of catalytic titanium. As used herein, an electrodepositable coating composition is "substantially free" of catalytic titanium if catalytic titanium is present, if at all, in an amount less than 0.01% by weight, based on the total resin solids weight of the composition. As used herein, an electrodepositable coating composition is "essentially free" of catalytic titanium if catalytic titanium is present, if at all, in trace or incidental amounts insufficient to affect any properties of the composition, such as, e.g., less than 0.001% by weight, based on the total resin solids weight of the composition. As used herein, an electrodepositable coating composition is "completely free" of catalytic titanium if catalytic titanium is not present in the composition, i.e., 0.000% by weight, based on the total resin solids weight of the composition.

The electrodepositable coating composition may be substantially free, essentially free, or completely free of metal amidine. As used herein, an electrodepositable coating composition is "substantially free" of metal amidine if metal amidine is present, if at all, in an amount less than 0.01% by weight, based on the total resin solids weight of the composition. As used herein, an electrodepositable coating composition is "essentially free" of metal amidine if metal amidine is present, if at all, in trace or incidental amounts insufficient to affect any properties of the composition, such as, e.g., less than 0.001% by weight, based on the total resin solids weight of the composition. As used herein, an electrodepositable coating composition is "completely free" of metal amidine if metal amidine is not present in the composition, i.e., 0.000% by weight, based on the total resin solids weight of the composition.

The electrodepositable coating composition may be substantially free, essentially free, or completely free of bismuth subnitrate. As used herein, an electrodepositable coating composition is "substantially free" of bismuth subnitrate if bismuth subnitrate is present, if at all, in an amount less than 0.01% by weight, based on the total resin solids weight of the composition. As used herein, an electrodepositable coating composition is "essentially free" of bismuth subnitrate if bismuth subnitrate is present, if at all, in trace or incidental amounts insufficient to affect any properties of the composition, such as, e.g., less than 0.001% by weight, based on the total resin solids weight of the composition. As used herein, an electrodepositable coating composition is "completely free" of bismuth subnitrate if bismuth subnitrate is not present in the composition, i.e., 0.000% by weight, based on the total resin solids weight of the composition.

The electrodepositable coating composition may be substantially free, essentially free, or completely free of bismuth oxide. As used herein, an electrodepositable coating composition is "substantially free" of bismuth oxide if bismuth oxide is present, if at all, in an amount less than 0.01% by weight, based on the total resin solids weight of the composition. As used herein, an electrodepositable coating composition is "essentially free" of bismuth oxide if bismuth oxide is present, if at all, in trace or incidental amounts insufficient to affect any properties of the composition, such as, e.g., less than 0.001% by weight, based on the total resin solids weight of the composition. As used herein, an electrodepositable coating composition is "completely free" of bismuth oxide if bismuth oxide is not present in the composition, i.e., 0.000% by weight, based on the total resin solids weight of the composition.

The electrodepositable coating composition may be substantially free, essentially free, or completely free of bismuth silicate. As used herein, an electrodepositable coating composition is "substantially free" of bismuth silicate if bismuth silicate is present, if at all, in an amount less than 0.01% by weight, based on the total resin solids weight of the composition. As used herein, an electrodepositable coating composition is "essentially free" of bismuth silicate if bismuth silicate is present, if at all, in trace or incidental amounts insufficient to affect any properties of the composition, such as, e.g., less than 0.001% by weight, based on the total resin solids weight of the composition. As used herein, an electrodepositable coating composition is "completely free" of bismuth silicate if bismuth silicate is not present in the composition, i.e., 0.000% by weight, based on the total resin solids weight of the composition.

The electrodepositable coating composition may be substantially free, essentially free, or completely free of bismuth titanate. As used herein, an electrodepositable coating composition is "substantially free" of bismuth titanate if bismuth titanate is present, if at all, in an amount less than 0.01% by weight, based on the total resin solids weight of the composition. As used herein, an electrodepositable coating composition is "essentially free" of bismuth titanate if bismuth titanate is present, if at all, in trace or incidental amounts insufficient to affect any properties of the composition, such as, e.g., less than 0.001% by weight, based on the total resin solids weight of the composition. As used herein, an electrodepositable coating composition is "completely free" of bismuth titanate if bismuth titanate is not present in the composition, i.e., 0.000% by weight, based on the total resin solids weight of the composition.

The electrodepositable coating composition may be substantially free, essentially free, or completely free of bismuth sulfamate. As used herein, an electrodepositable coating composition is "substantially free" of bismuth sulfamate if bismuth sulfamate is present, if at all, in an amount less than 0.01% by weight, based on the total resin solids weight of the composition. As used herein, an electrodepositable coating composition is "essentially free" of bismuth sulfamate if bismuth sulfamate is present, if at all, in trace or incidental amounts insufficient to affect any properties of the composition, such as, e.g., less than 0.001% by weight, based on the total resin solids weight of the composition. As used herein, an electrodepositable coating composition is "completely free" of bismuth sulfamate if bismuth sulfamate is not present in the composition, i.e., 0.000% by weight, based on the total resin solids weight of the composition.

The electrodepositable coating composition may be substantially free, essentially free, or completely free of bismuth lactate. As used herein, an electrodepositable coating composition is "substantially free" of bismuth sulfamate if bismuth lactate is present, if at all, in an amount less than 0.01% by weight, based on the total resin solids weight of the composition. As used herein, an electrodepositable coating composition is "essentially free" of bismuth lactate if bismuth lactate is present, if at all, in trace or incidental amounts insufficient to affect any properties of the composition, such as, e.g., less than 0.001% by weight, based on the total resin solids weight of the composition. As used herein, an electrodepositable coating composition is "completely free" of bismuth lactate if bismuth lactate is not present in the composition, i.e., 0.000% by weight, based on the total resin solids weight of the composition.

According to the present invention, the electrodepositable coating composition may further comprise other optional ingredients, such as a pigment composition and, if desired, various additives such as fillers, anti-oxidants, biocides, UV light absorbers and stabilizers, hindered amine light stabilizers, defoamers, fungicides, dispersing aids, flow control agents, surfactants, wetting agents, crater-control additives, or combinations thereof. Alternatively, the electrodepositable coating composition may be completely free of any of the optional ingredients, i.e., the optional ingredient is not present in the electrodepositable coating composition. The pigment composition may comprise, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion may be expressed as the pigment-to-resin weight ratio and may be within the range of 0.03 to 0.6, when pigment is used. The other additives mentioned above may each independently be present in the electrodepositable coating composition in amounts of 0.01% to 3% by weight, based on total weight of the resin solids of the electrodepositable coating composition.

According to the present invention, the electrodepositable coating composition may further comprise a plasticizer. The plasticizer may be any suitable plasticizer. The plasticizer may comprise, for example, a polyalkylene glycol, such as polyethylene glycol, polypropylene glycol, or polybutylene glycol. The polyalkylene glycol may comprise two secondary hydroxyl functional groups. The plasticizer may have a molecular weight of at least 400 g/mol, such as at least 500 g/mol, such as at least 700 g/mol. The plasticizer may have a molecular weight of no more 5,000 g/mol, such as no more than 1,000 g/mol, such as no more than 800 g/mol. The plasticizer may have a molecular weight of 400 to 5,000 g/mol, such as 400 to 1,000 g/mol, such as 400 to 800 g/mol, such as 500 to 5,000 g/mol, such as 500 to 1,000 g/mol, such as 500 to 800 g/mol, such as 700 to 5,000 g/mol, such as 700 to 1,000 g/mol, such as 700 to 800 g/mol.

According to the present invention, the electrodepositable coating composition may comprise water and/or one or more organic solvent(s). Water can for example be present in amounts of 40% to 90% by weight, such as 50% to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may in particular be provided in the form of a dispersion, such as an aqueous dispersion.

According to the present invention, the total solids content of the electrodepositable coating composition may be at least 1% by weight, such as at least 5% by weight, and may be no more than 50% by weight, such as no more than 40% by weight, such as no more than 20% by weight, based on the total weight of the electrodepositable coating composition. The total solids content of the electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the electrodepositable coating composition, i.e., materials which will not volatilize when heated to 110° C. for 15 minutes.

Substrates

According to the present invention, the electrodepositable coating composition may be electrophoretically applied to a substrate. The cationic electrodepositable coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvannealed steel, and steel plated with zinc alloy. Aluminum alloys of the 2XXX, 3XXX, 4XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091.

In examples, the substrate may comprise a three-dimensional component formed by an additive manufacturing process such as selective laser melting, e-beam melting, directed energy deposition, binder jetting, metal extrusion, and the like. In examples, the three-dimensional component may be a metal and/or resinous component.

Methods, Coatings and Coated Substrates

The present invention is also directed to a method of treating an electrodepositable coating composition comprising an at least partially solubilized bismuth catalyst and a source of phosphate ions, the method comprising adding a guanidine to the electrodepositable coating composition. The electrodepositable coating composition may be any of the electrodepositable coating compositions described herein. The guanidine may be included in the electrodepositable coating composition as initially prepared, added a post-add to a fully formulated electrodepositable coating composition, or added as a maintenance additive to an electrodepositable coating composition. Additional solubilized bismuth may also be added as a post-add or a maintenance additive to the electrodepositable coating composition. The guanidine may be added to the electrodepositable coating composition prior to, contemporaneously with, or after the addition of the source of phosphate ions to the electrodepositable coating composition. The source of phosphate ions may comprise carry-over from a metal phosphate-containing pretreatment composition or other phosphate-containing composition, the presence of a dispersing acid comprising a phosphorus acid, or a combination thereof. According to the method of the present invention, an amount of guanidine may be added such that the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention also provides a method of treating an electrodepositable coating composition comprising an at least partially solubilized bismuth catalyst and optionally a guanidine and/or a source of phosphate ions, the method comprising adding a guanidine or additional guanidine, and/or additional solubilized bismuth catalyst to the electrodepositable coating composition. The amount of the guanidine or the at least partially solubilized bismuth catalyst may be added in an amount such that the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0. The guanidine may optionally be added to the electrodepositable coating composition prior to the addition of the source of phosphate ions, if present, or in response to or in anticipation of diminished cure performance caused by contamination of the electrodepositable coating composition with phosphate ions.

The present invention also provides a method of treating an electrodepositable coating composition comprising an at least partially solubilized bismuth catalyst and a guanidine, and optionally a source of phosphate ions, the method comprising adding additional guanidine and/or additional solubilized bismuth catalyst to the electrodepositable coating composition. The amount of guanidine or at least partially solubilized bismuth catalyst may be added such that the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0. The guanidine may optionally be added to the electrodepositable coating composition prior to the addition of the source of phosphate ions, if present. The method of treating may be performed prior to the contamination of the electrodepositable coating composition with phosphate ions or in response to or in anticipation of diminished cure performance caused by contamination of the electrodepositable coating composition with phosphate ions.

The present invention also provides a method of treating an electrodepositable coating composition comprising an at least partially solubilized bismuth catalyst and a guanidine, the method comprising adding additional guanidine and/or additional solubilized bismuth catalyst to the electrodepositable coating composition. The amount of guanidine or at least partially solubilized bismuth catalyst may be added such that the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0. The method of treating may be performed prior to the contamination of the electrodepositable coating composition with phosphate ions or in response to or in anticipation of diminished cure performance caused by contamination of the electrodepositable coating composition with phosphate ions.

The present invention is also directed to a method of maintaining an electrodepositable coating composition subject to a source of phosphate ions, the method comprising measuring the concentration of solubilized bismuth metal and/or phosphate ions in the electrodepositable coating composition; measuring the concentration of guanidine in the electrodepositable coating composition; and adding guanidine and/or solubilized bismuth catalyst in an amount sufficient to adjust a weight ratio of solubilized bismuth metal from the solubilized bismuth catalyst to guanidine of from 1.00:0.071 to 1.0:2.1 and/or a molar ratio of bismuth metal to guanidine of from 1.0:0.25 to 1.0:3.0. The method may be performed in response to or in anticipation of diminished cure performance caused by contamination of the electrodepositable coating composition with phosphate ions.

The present invention is also directed to a method for coating a substrate comprising the steps of pretreating a metal substrate with a metal phosphate pretreatment composition; and electrodepositing a coating from an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention is also directed to a method for coating a substrate comprising the steps of treating a metal substrate with a phosphate-containing composition; and electrodepositing a coating from an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention is also directed to a system for coating metal substrates, the system comprising a pretreatment composition comprising a metal phosphate; and an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention is also directed to a system for coating metal substrates, the system comprising a phosphate-containing composition; and an electrodepositable coating composition comprising an electrodepositable binder comprising an ionic salt group-containing film-forming polymer comprising active hydrogen functional groups, and a blocked polyisocyanate curing agent; a solubilized bismuth catalyst; and a guanidine; wherein a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

The present invention is also directed to methods for coating a substrate, such as any one of the electroconductive substrates mentioned above. According to the present invention such method may comprise electrophoretically applying an electrodepositable coating composition as described above to at least a portion of the substrate and curing the coating composition to form an at least partially cured coating on the substrate. According to the present invention, the method may comprise (a) electrophoretically depositing onto at least a portion of the substrate an electrodepositable coating composition of the present invention and (b) heating the coated substrate to a temperature and for a time sufficient to cure the electrodeposited coating on the substrate. According to the present invention, the method may optionally further comprise (c) applying directly to the at least partially cured electrodeposited coating one or more pigment-containing coating compositions and/or one or more pigment-free coating compositions to form a topcoat over at least a portion of the at least partially cured electrodeposited coating, and (d) heating the coated substrate of step (c) to a temperature and for a time sufficient to cure the topcoat.

According to the present invention, the cationic electrodepositable coating composition of the present invention may be deposited upon an electrically conductive substrate by placing the composition in contact with an electrically conductive cathode and an electrically conductive anode, with the surface to be coated being the cathode. Following contact with the composition, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the cationic electrodepositable coating composition is electrodeposited over at least a portion of the electroconductive substrate, the coated substrate is heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. As discussed above, the electrodepositable coating composition is capable of curing at surprisingly low temperature. The coated substrate may be heated to a temperature ranging from 250° F. to 450° F. (121.1° C. to 232.2° C.), such as from 275° F. to 400° F. (135° C. to 204.4° C.), such as from 284° F. to 360° F. (140° C. to 180° C.), such as less than 302° F. (150° C.), such as less than 284° F. (140° C.). The curing time may be dependent upon the curing temperature as well as other variables, for example, the film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured electrodeposited coating may range from 15 to 50 microns.

According to the present invention, the anionic electrodepositable coating composition of the present invention may be deposited upon an electrically conductive substrate by placing the composition in contact with an electrically conductive cathode and an electrically conductive anode, with the surface to be coated being the anode. Following contact with the composition, an adherent film of the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the anionic electrodepositable coating composition is electrodeposited over at least a portion of the electroconductive substrate, the coated substrate may be heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. As discussed above, the electrodepositable coating composition is capable of curing at surprisingly low temperature. The coated substrate may be heated to a temperature ranging from 200° F. to 450° F. (93° C. to 232.2° C.), such as from 275° F. to 400° F. (135° C. to 204.4° C.), such as from 284° F. to 360° F. (140° C. to 180° C.), such as less than 302° F. (150° C.), such as less than 284° F. (140° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes. The thickness of the resultant cured electrodeposited coating may range from 15 to 50 microns.

The electrodepositable coating compositions of the present invention may also, if desired, be applied to a substrate using non-electrophoretic coating application techniques, such as flow, dip, spray and roll coating applications. For non-electrophoretic coating applications, the coating compositions may be applied to conductive substrates as well as non-conductive substrates such as glass, wood and plastic.

The present invention is further directed to a coating formed by at least partially curing the electrodepositable coating composition described herein.

The present invention is further directed to a substrate that is coated, at least in part, with the electrodepositable coating composition described herein in an at least partially cured state.

Multi-Layer Coating Composites

The electrodepositable coating compositions of the present invention may be utilized in an electrocoating layer that is part of a multi-layer coating composite comprising a substrate with various coating layers. The coating layers may include a pretreatment layer, such as a phosphate layer (e.g., zinc phosphate layer), an electrocoating layer which results from the electrodepositable coating composition of the present invention, and suitable topcoat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The topcoat typically includes a film-forming polymer, crosslinking material and, if a colored base coat or monocoat, one or more pigments. According to the present invention, the primer layer is disposed between the electrocoating layer and the base coat layer. According to the present invention, one or more of the topcoat layers are applied onto a substantially uncured underlying layer. For example, a clear coat layer may be applied onto at least a portion of a substantially uncured basecoat layer (wet-on-wet), and both layers may be simultaneously cured in a downstream process.

Moreover, the top-coat layers may be applied directly onto the electrodepositable coating layer. In other words, the substrate lacks a primer layer. For example, a basecoat layer may be applied directly onto at least a portion of the electrodepositable coating layer.

It will also be understood that the top-coat layers may be applied onto an underlying layer despite the fact that the underlying layer has not been fully cured. For example, a clearcoat layer may be applied onto a basecoat layer even though the basecoat layer has not been subjected to a curing step. Both layers may then be cured during a subsequent curing step thereby eliminating the need to cure the basecoat layer and the clearcoat layer separately.

According to the present invention, additional ingredients such as colorants and fillers may be present in the various coating compositions from which the top-coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. patent application Ser. No. 10/876,031 filed Jun. 24, 2004, which is incorporated herein by reference, and U.S. Provisional Patent Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed, and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

According to the present invention, the photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. patent application Ser. No. 10/892,919 filed Jul. 16, 2004 and incorporated herein by reference.

As used herein, the term "resin solids" include the ionic salt group-containing film-forming polymer, the blocked polyisocyanate curing agent, and any additional water-dispersible non-pigmented component(s) present in the electrodepositable coating composition.

As used herein, the term "polymer" encompasses, but is not limited to, oligomers and both homopolymers and copolymers.

As used herein, unless otherwise defined, the term substantially free means that the component is present, if at all, in an amount of less than 5% by weight, based on the total weight of the slurry composition.

As used herein, unless otherwise defined, the term essentially free means that the component is present, if at all, in an amount of less than 1% by weight, based on the total weight of the slurry composition.

As used herein, unless otherwise defined, the term completely free means that the component is not present in the slurry composition, i.e., 0.00% by weight, based on the total weight of the slurry composition.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "an" ionic salt group-containing film-forming polymer, "a" blocked polyisocyanate curing agent, "a" guanidine, and/or "a" bismuth catalyst, a combination (i.e., a plurality) of these components may be used. In addition, in this application, the use of "or" means "and/or" unless specifically stated otherwise, even though "and/or" may be explicitly used in certain instances.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Illustrating the invention are the following examples, which, however, are not to be considered as limiting the invention to their details. Unless otherwise indicated, all parts and percentages in the following examples, as well as throughout the specification, are by weight.

EXAMPLES

Example 1: Preparation of a Blocked Polyisocyanate Curing Agent Comprising Isocyanato Groups Blocked with a 1,2-Polyol Blocking Agent (Crosslinker I)

A blocked polyisocyanate crosslinker comprising blocking groups blocked with 1,2-polyol (Crosslinker I), suitable for use in electrodepositable coating resins, was prepared in the following manner. Components 2-6 listed in Table 1, below, were mixed in a flask set up for total reflux with stirring under nitrogen. The mixture was heated to a temperature of 30° C., and Component 1 was added dropwise so that the temperature increased due to the reaction exotherm and was maintained under 90° C. After the addition of Component 1 was complete, Component 7 was added and a temperature of 100° C. was established in the reaction mixture for 1-2 hours. The reaction mixture was held at temperature until no residual isocyanate was detected by IR spectroscopy. Component 8 was then added, and the reaction mixture was allowed to stir for 30 minutes and cooled to ambient temperature.

TABLE 1

Components for the preparation of Crosslinker I

| No. | Component | Parts-by-weight (grams) |
|---|---|---|
| 1 | Polymeric methylene diphenyl diisocyanate | 16200.6 |
| 2 | Dibutyl tin dilaurate | 14.8 |
| 3 | Propylene glycol | 5513.0 |
| 4 | Butyl Carbitol | 7834.3 |
| 5 | Alcohol Blend[1] | 1.0 |
| 6 | Butyl Carbitol Formal | 2709.4 |
| 7 | Butyl Carbitol Formal | 985.0 |
| 8 | Bisphenol A - ethylene oxide adduct (1/6 molar ratio BPA/EtO) | 3695.0 |

[1]Blend of propylene glycol, trimethylol propane, isobutyl alcohol, 2-butoxyethanol, propylene glycol monomethyl ether, propylene glycol monobutyl ether, ethanol, methanol, ethoxylated bisphenol A polyol.

Example 2: Preparation of a Blocked Polyisocyanate Curing Agent Comprising Isocyanato Groups Blocked with Triethylene Glycol Monomethyl Ether Blocking Agent (Crosslinker II)

A blocked polyisocyanate crosslinker comprising blocking groups blocked with triethylene glycol monomethyl ether (Crosslinker II), suitable for use in electrodepositable coating resins, was prepared in the following manner. Components 2-5 listed in Table 2, below, were mixed in a flask set up for total reflux with stirring under nitrogen. The mixture was heated to a temperature of 35° C., and Component 1 was added dropwise so that the temperature increased due to the reaction exotherm and was maintained under 100° C. After the addition of Component 1 was complete, a temperature of 110° C. was established in the reaction mixture and the reaction mixture held at temperature until no residual isocyanate was detected by IR spectroscopy. Component 6 was then added, and the reaction mixture was allowed to stir for 30 minutes at that temperature, removed from the flask, and cooled to ambient temperature.

TABLE 2

Components for the preparation of Crosslinker II

| No. | Component | Parts-by-weight (grams) |
|---|---|---|
| 1 | Polymeric methylene diphenyl diisocyanate | 1340.00 |
| 2 | K Kat XK 620[1] | 2.77 |
| 3 | Triethylene glycol monomethyl ether | 1149.40 |
| 4 | Polyethylene glycol 400[2] | 600.00 |
| 5 | Butyl Carbitol Formal | 12.00 |
| 6 | Bisphenol A - ethylene oxide adduct (1/6 molar ratio BPA/EtO) | 132.00 |

[1]Zinc amidine catalyst available from King Industries.
[2]Polyethylene glycol 400 available from Aldrich.

Example 3: Preparation of a Cationic, Amine-Functionalized, Polyepoxide-Based Resin Comprising Crosslinker I (Resin Dispersion A)

A cationic, amine-functionalized, polyepoxide-based polymeric resin comprising Crosslinker I, suitable for use in formulating electrodepositable coating compositions, was prepared in the following manner. Components 1-5 listed in Table 3, below, were combined in a flask set up for total reflux with stirring under nitrogen. The mixture was heated to a temperature of 130° C. and allowed to exotherm (145° C. maximum). A temperature of 145° C. was established in the reaction mixture and the reaction mixture was then held for 2 hours. Component 6 was then introduced into the reaction mixture and a temperature of 105° C. was established in the reaction mixture. Components 7-8 were then added to the reaction mixture quickly (sequential addition) and the reaction mixture was allowed to exotherm. A temperature of 120° C. was established in the reaction mixture and the reaction mixture held for 1 hour, resulting in Resin Synthesis Product A.

A portion of the Resin Synthesis Product A (Component 10) was then poured into a pre-mixed solution of Components 11 and 12 to form a resin dispersion, and the resin dispersion was stirred for 30 minutes. Component 13 was added and stirred for 30 minutes, followed by Component 14 and further stirred for 30 minutes.

The solids content of the resulting cationic, amine-functionalized, polyepoxide-based polymeric resin dispersion, comprising a propylene glycol-based crosslinker added during the resin synthesis stage, was determined by adding a quantity of the resin dispersion to a tared aluminum dish, recording the initial weight of the resin dispersion, heating the resin dispersion in the dish for 60 minutes at 110° C. in an oven, allowing the dish to cool to ambient temperature, reweighing the dish to determine the amount of non-volatile content remaining, and calculating the solids content by dividing the weight of the remaining non-volatile content by the initial resin dispersion weight and multiplying by 100.

(Note, this procedure was used to determine the solids content in each of the resin dispersion examples described herein.) The resulting Resin Dispersion A had a solids content of 38.52% by weight.

TABLE 3

Components for the preparation of Resin Dispersion A

| No. | Component | Parts-by-weight (grams) |
|---|---|---|
| | Resin Synthesis Stage | |
| 1 | Bisphenol A diglycidyl ether | 627.5 |
| 2 | Bisphenol A | 264.5 |
| 3 | DER-732[1] | 16.4 |
| 4 | Bisphenol A - ethylene oxide adduct (1/6 molar ratio BPA/EtO) | 125.8 |
| 5 | Ethyl triphenyl phosphonium bromide | 1 |
| 6 | Crosslinker I[2] | 1061 |
| 7 | Diethylenetriamine | 18.8 |
| 8 | Methyl ethanol amine | 58.5 |
| | Resin Dispersion Stage | |
| 10 | Resin Synthesis Product A | 1955.3 |
| 11 | Formic acid (90%) | 32.0 |
| 12 | Deionized water | 1562.2 |
| 13 | Amine-functional epoxy additive | 245.0 |
| 14 | Deionized water | 1423.0 |

[1]Aliphatic diepoxide available from the Dow Chemical Company.
[2]See synthesis of Crosslinker I in Example 1.

Example 4: Preparation of a Cationic, Amine-Functionalized, Polyepoxide-Based Resin Comprising Crosslinker II (Resin Dispersion B)

A cationic, amine-functionalized, polyepoxide-based polymeric resin comprising Crosslinker II, suitable for use in formulating electrodepositable coating compositions, was prepared in the following manner. Components 1~4 listed in Table 4, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Components 5-6 were then introduced into the reaction mixture and a temperature of 110° C. was established in the reaction mixture. Components 7-9 were then added to the reaction mixture quickly and the reaction mixture was allowed to exotherm. A temperature of 121° C. was established in the reaction mixture and the reaction mixture held for 1 hour. After the hold, the reaction mixture was poured out from the flask and allowed to cool to room temperature.

TABLE 4

Components for the preparation of Resin Dispersion B

| No. | Component | Parts-by-weight (grams) |
|---|---|---|
| | Resin Synthesis Stage | |
| 1 | Bisphenol A diglycidyl ether | 2335.78 |
| 2 | Bisphenol A | 1007.84 |
| 3 | Bisphenol A - ethylene oxide adduct (1/6 molar ratio BPA/EtO) | 380 |
| 4 | Ethyl triphenyl phosphonium bromide | 2.28 |
| 5 | Bisphenol A - ethylene oxide adduct (1/6 molar ratio BPA/EtO) | 598.71 |
| 6 | Crosslinker II[1] | 3022.4 |
| 7 | N-(3-Aminopropyl)diethanolamine | 82.73 |

TABLE 4-continued

Components for the preparation of Resin Dispersion B

| No. | Component | Parts-by-weight (grams) |
|---|---|---|
| | Resin Synthesis Stage | |
| 8 | Methyl ethanol amine | 179 |
| 9 | Butyl Carbitol Formal | 425.6 |

[1]See synthesis of Crosslinker II in Example 2.

Example 5: Cationic Resin

A cationic resin was prepared in the following manner from the materials included in Table 5: Materials 1, 2, 3 are added to a suitably equipped round bottom flask. The mixture is then heated to 125° C. Material 4 is then added. The reaction mixture is allowed to exotherm to 160° C., add heat as required to reach 160° C. The reaction mixture is then held at 160-170° C. for 1 hour. Material 5 is added and mixed well. Material 6 is then added as rapidly as possible. The resulting reaction mixture is heated to 130° C. and held for 3 hours. Materials 7 and 8 are preblended and the reaction mixture is added to the acidic water solution under agitation to form a cationic dispersion.

TABLE 5

| No. | Component | Parts-by-weight (grams) |
|---|---|---|
| 1 | EPON 828 | 752 |
| 2 | Bisphenol A | 228 |
| 3 | buCarb formal | 108.89 |
| 4 | ETPPI | 0.752 |
| 5 | buCarb formal | 298.63 |
| 6 | JEFFAMINE D2000 | 2687.74 |
| 7 | Sulfamic acid | 131.93 |
| 8 | Deionized water | 7812.62 |

Example 6: Cationic Resin Intermediate

TABLE 6

| # | Material | parts |
|---|---|---|
| 1 | EPON 828 | 8940.2 |
| 2 | Bisphenol A-ethylene oxide adduct[1] | 3242.1 |
| 3 | Bisphenol A | 2795.8 |
| 4 | Methyl isobutyl ketone | 781.8 |
| 5 | Tetronic 150R1[2] | 8.1 |
| 6 | Benzyldimethylamine | 12.4 |
| 7 | Benzyldimethylamine | 18.24 |
| 8 | Diketimine[3] | 1623.6 |
| 9 | N-methylethanolamine | 758.7 |
| 10 | Sulfamic acid | 1524.4 |
| 11 | Deionized water | 12561 |
| 12 | Deionized water | 7170.3 |
| 13 | Deionized water | 11267.7 |
| 14 | Deionized water | 8450.7 |

[1]A 6 mole ethoxylate of Bishpenol A.
[2]Tetronic 150R1 is a nonionic surfactant available from BASF.
[3]Diketimine is the reaction product of diethylene triamine and Methyl isobutyl ketone at 72.3% solids in Methyl isobutyl ketone.

A cationic resin intermediate was prepared in the following manner from the materials included in Table 6: Materials 1-5 (EPON 828, bisphenol A-ethylene oxide adduct, bisphenol A, methyl isobutyl ketone, and Tetronic 150R1) were charged into a reaction vessel and heated under a nitrogen atmosphere to 125° C. The first portion of the benzyldimethylamine, Material 6, was added and the reaction allowed to exotherm to around 180° C. When the reaction reached 160° C., a one-hour hold was started. After the peak exotherm, the resin was allowed to cool back to 160° C., continuing the hold. After the hold, the reaction was then cooled to 130° C. and the second portion of benzyldimethylamine Material 7 was added. The reaction was held at 130° C. until an extrapolated epoxy equivalent weight of 1070. At the expected epoxy equivalent weight Materials 8 and 9 (Diketimine and N-methylethanolamine) were added in succession and the mixture allowed to exotherm to around 150° C. At the peak exotherm, a one-hour hold was started while allowing the reaction to cool to 125° C. After the one-hour hold, the resin was dispersed in an aqueous medium consisting of sulfamic acid and the first portion of deionized water. The dispersion was later reduced with the second, third, and fourth portions of deionized water. The resulting cationic soap was vacuum striped until the methyl isobutyl ketone content was less than 0.05%.

Example 7: Cationic Resin

TABLE 7

| # | Material | Parts |
|---|---|---|
| 1 | Cationic resin intermediate of Example 6 | 50.10 |
| 2 | Propylene glycol mono propyl ether | 1.34 |
| 3 | Deionized Water | 1.47 |
| 4 | EPON 828 solution[1] | 781.8 |
| 5 | Ethylene Glycol mono butyl ether | 1.34 |
| 6 | Rhoadameen C5[2] | 1.98 |
| 7 | Deionized water | 0.93 |
| 8 | Deionized water | 4.00 |
| 9 | Deionized water | 14.97 |

[1]85% EPON 828 (Epoxy resin available from Hexion Chemicals) + 15% Propylene glycol methyl ether.
[2]A surfactant available from Rhodia Chemicals.

A cationic resin was prepared in the following manner from the materials included in Table 7: Charge Material 1 to the reactor. Set temperature to 70° C. and start heating the reactor. Add charge 2 and 3 sequentially. Hold until reactor reaches 70° C. Over the next 15 minutes add Material 4 to the reactor. Add Material 5 to the reactor and hold for 45 minutes at 70° C. Heat reactor to 88° C. and hold for 3 hours. Two and ½ hours into the hold time, add Materials 6 and 7 to the reactor. Turn off heat and add Material 8. Once reactor has reached 32° C., add item 9 and hold for 1 hour.

Example 8: Preparation of a Cationic Resin, Bicyclic Guanidine-Functionalized Polyepoxide-Based Resin (Resin Dispersion C)

A cationic, bicyclic guanidine-functionalized, polyepoxide-based polymeric resin was prepared in the following manner. Components 1-6 listed in Table 8, below, were mixed in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 1 hour. Component 7 was introduced slowly while allowing the mixture to cool to 100° C. followed by the addition of Component 7. A temperature of 100° C. was established, and Component 8 were then added to the reaction mixture quickly and the reaction mixture was allowed to exotherm. A temperature of 100° C. was established and the reaction mixture held for 1 hour, resulting in Resin Synthesis Product B.

TABLE 8

Components for preparation of Cationic Resin

| No. | Component | Parts-by-weight (grams) |
|---|---|---|
| | Resin Synthesis Stage | |
| 1 | Bisphenol A diglycidyl ether [1] | 1353.60 |
| 2 | Bisphenol A | 507.07 |
| 3 | Bisphenol A - ethylene oxide adduct (1/6 molar ratio BPA/EtO) | 242.78 |
| 4 | Nonyl phenol | 48.69 |
| 5 | Ethyl triphenyl phosphonium bromide | 1.51 |
| 6 | Propasol B | 112.04 |
| 7 | Propasol B | 22.41 |
| 8 | 1,5,7-Triazabicyclo[4.4.0]dec-5-ene solution[2] | 735.14 |
| | Resin Dispersion Stage | |
| 10 | Resin Synthesis Product B | 2720.92 |
| 11 | Formic acid solution in water, 90% | 63.01 |
| 12 | Glacial acetic acid | 33.05 |
| 13 | Deionized water | 2056.06 |
| 14 | Deionized water | 1359.27 |

[1] EPON 828, available from Hexion Corporation.
[2]37.5% by weight solution in the mixture of propylene glycol monomethyl ether and n-butoxypropanol (20:80% ratio by weight).

A portion of the Resin Synthesis Product B (Component 10) was then poured into a pre-mixed solution of Components 11-13 to form a resin dispersion, and the resin dispersion was stirred for 1 hour. Component 14 was then introduced over 30 minutes to further dilute the resin dispersion. The solids content of the resulting resin dispersion was determined by the method described above. The resulting Resin Dispersion C had a solids content of 35.12% by weight.

Example 9: Preparation of a Bismuth Catalyst Solution I

An aqueous bismuth methane sulfonate catalyst solution was prepared using the ingredients from Table 9 in the following manner: Component 1 was added to an Erlenmeyer flask with stirring, followed by the sequential introduction of Components 2 and 3. The content of the flask was stirred for 3 hours at room temperature, and the resulting catalyst solution was then filtered through a Buchner funnel to remove any undissolved residue.

TABLE 9

| # | Material | Parts (g) |
|---|---|---|
| 1 | Deionized water | 3645.1 |
| 2 | Methanesulfonic acid[1] | 76.4 |
| 3 | Bismuth(III) oxide[2] | 115.1 |

[1]70% solution in deionized water.
[2]5N Frit grade.

Example 10: Preparation of a Bismuth Catalyst Solution II

An aqueous bismuth methane sulfonate catalyst solution was prepared using the ingredients from Table 10 in the following manner: Component 1 was added to an Erlenmeyer flask with stirring, followed by the sequential introduction of Components 2 and 3. The content of the flask was stirred for 3 hours at room temperature, and the resulting catalyst solution was then filtered through a Buchner funnel to remove any undissolved residue.

TABLE 10

| # | Material | Parts (g) |
|---|---|---|
| 1 | Deionized water | 843.86 |
| 2 | Methanesulfonic acid[1] | 76.75 |
| 3 | Bismuth(III) oxide[2] | 115.51 |

[1]70% solution in deionized water.
[2]5N Frit grade.

Example 11: Preparation of Catalyst Free Pigment Paste A

Preparation of resin 11-1: An amine-acid salt quaternizing agent was prepared as follows:

TABLE 11

| # | Material | parts |
|---|---|---|
| 1 | Dimethyl ethanolamine | 445 |
| 2 | PAPI 290[1] | 660 |
| 3 | Butyl Carbitol Formal[2] | 22.1 |
| 4 | 88% lactic acid aqueous | 512 |
| 5 | Deionized water | 2136.11 |

[1]Polymeric diisocyanate commercially available from Dow Chemical Co.
[2]Available as Mazon 1651 from BASF Corporation.

To a suitably equipped 5-liter flask material 1 was charged. Material 2 was then charged under mild agitation over a 1.5-hour period, followed by a rinse of Material 3. During this addition, the reaction mixture was allowed to exotherm to a temperature of about 89° C. and held at that temperature for about 1 hour until complete reaction of the isocyanate as determined by infrared spectroscopy. At that time, Material 4 was added over a 25-minute period, followed Material 5. The reaction temperature was held at about 80° C. for about 6 hours until a stalled acid value of 70.6 was obtained.

A quaternary ammonium salt group-containing pigment grinding resin was prepared using the amine-acid salt quaternizing agent according to the following procedure: Material 1 was charged to a suitably equipped 5-liter flask were added, under mild agitation. Material 2 was then added followed by Material 3 and Material 4. The reaction mixture was heated to about 140° C., allowed to exotherm to about 180° C., then cooled to about 160° C. and held at that temperature for about 1 hour. At that time the polymeric product had an epoxy equivalent weight of 982.9. The reaction mixture was then cooled to a temperature of about 130° C. at which time Material 5 was added and the temperature lowered to about 95°-100° C., followed by the addition of Material 6, the amine-acid salt quaternizing agent (prepared above), over a period of 15 minutes, and subsequently followed by the addition of about 1428.1 parts by weight of deionized water. The reaction temperature was held at about 80° C. for approximately 6 hours until the acid number of the reaction product fell below 1.0. The resultant quaternary ammonium salt group-containing pigment grinding resin was further reduced with about 334.7 parts by weight of the solvent of Butyl Carbitol Formal. This mixture was used as Resin 11-1 below.

TABLE 12

| # | Material | parts |
|---|---|---|
| 1 | Bisphenol A Diglycidyl ether[1] | 528.8 |
| 2 | Bisphenol A | 224.9 |
| 3 | Butyl Carbitol Formal[2] | 83.7 |
| 4 | ethyltriphenylphosphonium iodide | 0.5 |
| 5 | Butyl Carbitol Formal[2] | 164.9 |
| 6 | Amine-acid salt quaternizing agent (described above) | 418.4 |
| 7 | Deionized water | 1428.1 |
| 8 | Butyl Carbitol Formal[2] | 334.7 |

[1]Diglycidyl ether of Bisphenol A available from Resolution Chemical Co as EPON 828.
[2]Available as Mazon 1651 from BASF Corporation.

Preparation of the pigment paste: The catalyst free pigment dispersion (Pigment Paste A) was prepared by sequentially adding the ingredients listed below under high shear agitation. When the ingredients were thoroughly blended, the pigment dispersion was transferred to a vertical sand mill and ground to a Hegman value of >7.5.

TABLE 13

| # | Material | PARTS BY WEIGHT |
|---|---|---|
| 1 | Cationic Resin from Example 11-1 | 510.5 |
| 2 | Printex 200[1] | 41.6 |
| 3 | Kaolin clay | 377.0 |
| 4 | Deionized water | 177.9 |

[1]Carbon black pigment available from The Cary Company.

Example 12: Preparation of Electrodepositable Coating Composition A-E

TABLE 14

| | | Paint (g) | | | |
|---|---|---|---|---|---|
| No. | Material | A | B | C | D |
| 1 | Resin Dispersion A - Example 3 | 197.5 | 192.5 | 187.5 | 177.9 |
| 2 | Cationic Resin Example 5 | 13.5 | 13.5 | 13.5 | 13.5 |
| 3 | FEX-1651 | 0.9 | 0.9 | 0.9 | 0.9 |
| 4 | Cationic Resin Example 7 | 14.6 | 14.6 | 14.6 | 14.6 |
| 5 | Bismuth Catalyst Solution I (Example 9) | 33.8 | 33.8 | 33.8 | 33.8 |
| 6 | Deionized Water | 105.0 | 105.0 | 105.0 | 105.0 |
| 7 | Pigment Paste A (Example 11) | 24.1 | 24.1 | 24.1 | 24.1 |
| 8 | Resin Dispersion C Example 8 | 0 | 5.5 | 11.2 | 21.8 |
| 9 | Deionized Water | 110.6 | 110.1 | 109.4 | 108.4 |

For each paint composition, Charges 1-4 were added sequentially into a plastic container at room temperature under agitation with 10 minutes of stirring after each addition. The mixture was stirred for at least 30 minutes at room temperature. Charges 5 and 6 were preblended and added slowly and stirred for 30 minutes at room temperature. Charge 7 was then added, and the paint was allowed to stir until uniform, a minimum of 30 minutes. Charges 8 and 9 were added, and the paint was allowed to stir for a minimum of 30 minutes until uniform. The resulting cationic electrodepositable paint compositions had a solids content of 20.0%, and a pigment to binder ratio of 0.10/1.0 by weight.

Coated panels were prepared from baths separately containing the cationic electrodepositable paint compositions and were evaluated for solvent resistance by double acetone rubs. The results are reported below.

Evaluation of Cationic Electrodepositable Coating Compositions

The composition of each of paints (A-E) were coated over 7 cm×10 cm×0.08 cm cold rolled steel panels coated with C700 NO (4"×12") from ACT Test Panels, LLC. A hole was punched in the top of each panel. Samples were submerged in 500 mL of test solutions in a 2 L cylindrical glass beaker on a stir plate. Coating conditions for electrodeposition were between 180 to 250 volts for 2-3 minutes at a bath temperature of 30-34° C. Coated substrates were rinsed with deionized water and air dried for a period of at least 30 minutes. Panels were baked at 130, 140, or 150° C. for 30 minutes using an electric oven (Despatch Industries, model LFD-series). Each of the panels had a dry film thickness between 22.5 and 26.25 microns. The baked coatings were allowed to equilibrate at room temperature for 16 hours. Samples were double rubbed with a home-built machine comprising of an arm affixed to a motor (Rex Engineering 6142K57 Compact AC Gearmotor 115V) at a speed of 1 double rub per second, a contact area of 1 inch by 0.5 inch weighted with two equally distributed 750 g cylindrical weights, the contact area covered with a 1.1-inch strip cloth of traditional muslin cloth (JoAnn Fabrics, item #7794548), a full range of motion of the arm of 2 inches. The sample was doused with sufficient acetone from a squirt bottle and the machine was allowed to double rub for 60 seconds as measured with a GraLab 451 High-Accuracy Digital Electronic Timer. The panels were visually inspected and rated on a scale of 0-10 wherein the ratings correspond to the following scale: Cure Rating: 0—Breaks through to substrate in 0-15 seconds; 1—Breaks through to substrate in 6-30 seconds; 2—Breaks through to substrate in 31-45; 3—Breaks through to substrate in 46-60 seconds; 4—partial breakthrough to substrate; 5—Very heavy mar; 6—Heavy mar; 7—Mar; 8—Slight mar; 9—Trace mar; 10—No effect.

Each bath had sequential additions of zinc phosphate pretreatment bath. Chemfos700AL (commercially available from PPG Industries) was made according to manufacturer guidelines. Precise concentration of phosphate ions was determined by ICP. Bath additions were made at 100 ppm or 200 ppm of total bath weight and stirred for 16 hours before coating out. Panels were coated, baked, and double acetone rub was performed. The double rub ratings as a function of phosphate concentration are listed in Table 15.

TABLE 15

Double Rub Ratings at Bake Condition of 30 minutes at 140° C.

| Paint | Wt. % BCG on resin solids | Wt. % Bi on resin solids | Wt. Ratio Bi:BCG | Molar Ratio Bi:BCG | Phosphate 0 ppm | Phosphate 100 ppm | Phosphate 200 ppm | Solvent resistance test at 200 ppm |
|---|---|---|---|---|---|---|---|---|
| A | 0    | 1 | 0      | 0      | 9 | 8 | 4 | Fail |
| B | 0.24 | 1 | 1:0.24 | 1:0.36 | 9 | 9 | 7 | Pass |
| C | 0.49 | 1 | 1:0.49 | 1:0.74 | 9 | 9 | 8 | Pass |
| D | 0.95 | 1 | 1:0.95 | 1:1.43 | 9 | 9 | 7 | Pass |

The results in the table above show the surprising result that the combination of bismuth catalyst with Cationic Resin C in Electrodepositable Coating Compositions B-E maintained solvent resistance rating at 200 ppm phosphate.

Example 13: Preparation of Electrodepositable Coating Composition F-H

TABLE 16

| | | Paint (g) | | |
|---|---|---|---|---|
| No. | Material | E | F | G |
| 1 | Resin Dispersion B - Example 4 | 803.5 | 803.5 | 803.5 |
| 2 | Phosphoric Acid | 5.7 | 5.7 | 0 |
| 3 | Deionized Water | 80.5 | 80.5 | 80.5 |
| 4 | ASP 200[1] | 280 | 280 | 280 |
| 5 | Resin Dispersion Product | 818.8 | 818.8 | 814.8 |
| 6 | Deionized Water | 707.8 | 707.8 | 705 |
| 7 | Formic Acid (90%) | 3.55 | 3.55 | 3.55 |
| 8 | Deionized Water | 2299.85 | 2299.85 | 2293.65 |
| 9 | Resin Dispersion C Example 8 | 0 | 32.3 | 0 |
| 10 | Bismuth Catalyst Solution II (Example 10) | 49 | 49 | 49 |

[1]Available from BASF

Comparative Example E: A stainless steel beaker (2-liters) was loaded with 803.5 grams of Resin Dispersion B (Example 4) which had then been warmed to 85° C. using thermocouple and heating mantle. A 1.5-inch Cowles blade was used to agitate the resin at 2500 RPM powered by a Fawcett air motor (Model 103A). Phosphoric acid (85% aq, 5.7 g) and then DI water (80.5 g) were added to resin system X, which was then mixed for ten minutes. Next, ASP 200 (280 g available from BASF) was added over five minutes. This mixture was then allowed to mix for one hour. A portion (818.8 g, 70% of the total weight) of the clay/resin paste was added to a mixture of water (707.8 g) and Formic acid (90% aq, 3.55 g) in a large stainless-steel beaker to produce a waterborne dispersion. This dispersion was allowed to mix for 1 hour. Deionized water was added to the dispersion to yield a total 3830 g of electrocoat bath. Finally, Bismuth-MSA solution (10% aq, 49 g) was slowly added to the bath. The final bath had a pH of 5.57, and 1% by weight bismuth metal, the % by weight based upon resin solids.

Example F: A stainless steel beaker (2-liters) was loaded with 803.5 grams of Resin Dispersion B (Example 4) which had then been warmed to 85° C. using thermocouple and heating mantle. A 1.5-inch Cowles blade was used to agitate the resin at 2500 RPM powered by a Fawcett air motor (Model 103A). Phosphoric acid (85% aq, 5.7 g) and then DI water (80.5 g) were added Resin Dispersion B, which was then mixed for ten minutes. Next, ASP 200 (280 g available from BASF) was added over five minutes. This mixture was then allowed to mix for one hour. A portion (818.8 g, 70% of the total weight) of the clay/resin paste was added to a mixture of water (707.8 g) and Formic acid (90% aq, 3.55 g) in a large stainless-steel beaker to produce a waterborne dispersion. This dispersion was allowed to mix for 1 hour. Deionized water was added to the dispersion to yield a total 3830 g of electrocoat bath. Bicyclic Guanidine containing resin (3.8% Bicyclic Guanidine, 32.3 g) was then added to the bath and allowed to mix for 30 minutes. Finally, Bismuth-MSA solution (10% aq, 49 g) was slowly added to the bath. The final bath had a pH of 5.49, 1% by weight bismuth metal, and 0.25% by weight BCG, the % by weight based upon resin solids.

Comparative Example G: A stainless steel beaker (2-liters) was loaded with 803.5 grams of Resin Dispersion B (Example 4) which had then been warmed to 85° C. using thermocouple and heating mantle. A 1.5-inch Cowles blade was used to agitate the resin at 2500 RPM powered by a Fawcett air motor (Model 103A). DI water (80.5 g) was then added to resin system X, which was then mixed for ten minutes. Next, ASP 200 (280 g available from BASF) was added over five minutes. This mixture was then allowed to mix for one hour. A portion (814.8 g, 70% of the total weight) of the clay/resin paste was added to a mixture of water (705 g) and Formic acid (90% aq, 3.55 g) in a large stainless-steel beaker to produce a waterborne dispersion. This dispersion was allowed to mix for 1 hour. Deionized water was added to the dispersion to yield a total 3817 g of electrocoat bath. Finally, Bismuth-MSA solution (10% aq, 49 g) was slowly added to the bath. The final bath had a pH of 5.6, and 1% by weight bismuth metal, the % by weight based upon resin solids.

Evaluation of Cure Response: CRS panels pretreated with zinc phosphate (C700 item: 28630 available from ACT, Hillsdale, MI.) were cut in half to yield a 4" by 6" panel. Panels were fully submerged in the electrocoat baths and electrodeposition began. A rectifier (Xantrax Model XFR600-2, Elkhart, Indiana, or Sorensen XG 300-5.6, Ameteck, Berwyn, Pennsylvania) which was DC-power supplied was used to apply the electrodepositable coating. This film thickness was deposited by using a voltage/temperature/current condition for two minutes. Exact coating conditions for each paint are found in the Table 17. After panels were electrocoated, these panels were rinsed with deionized water and baked at 350° F. for 30 minutes in an electric oven (Despatch Model LFD-1-42). After baking, the panels were allowed to cool at ambient conditions for 20 minutes. Film thickness was measured using a Fischerscope MMS device purchased from Fischer Technology Inc. After measuring film thickness, cure was evaluated by double acetone rub testing. The baked panels were rubbed with an acetone soaked WYPALL X80 disposable paper wipe manufactured by Kimberly-Clark. The rubs are counted as a double rub (one rub forward and rub backward constitutes a double rub). The panels are rated on a scale of 0-10 wherein the ratings correspond to the following scale: Cure Rating: 0 Breaks through to substrate in less than 10 rubs; 1 Breaks through to substrate in 10-19 rubs; 2 Breaks through to substrate in 20-29 rubs; 3 Breaks through to substrate in 30-39 rubs; 4 Breaks through to substrate in 40-49 rubs; 5 Breaks through to substrate in 50-99 rubs; 6 Heavy mar (100 rubs); 7 Mar (100 rubs); 8 Slight mar (100 rubs); 9 Trace mar (100 rubs); 10 No effect (100 rubs). Cure response ratings can be found in Table 17.

The data in Table 17 demonstrates that there is a significant reduction in cure response when phosphoric acid pollutants are entered into the resin system (compare Comparative Example E to Comparative Example G). The data furthermore shows that the inclusion of a guanidine in the electrocoat bath can significantly reduce this reduction in cure response caused by the phosphoric acid in the resin system (compare Comparative Example E to Example F).

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. An electrodepositable coating composition comprising:
   (a) an electrodepositable binder comprising:
      (1) an ionic salt group-containing film-forming polymer comprising active hydrogen functional groups; and
      (2) a blocked polyisocyanate curing agent;
   (b) a solubilized bismuth catalyst;
   (c) a guanidine;
   wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

2. The electrodepositable coating composition of claim 1, wherein the polyisocyanate curing agent comprises blocking groups, and at least 30% of the blocking groups comprise a 1,2-polyol as a blocking agent, based upon the total number of blocking groups.

3. The electrodepositable coating composition of claim 1, wherein the solubilized bismuth catalyst comprises a bismuth salt.

4. The electrodepositable coating composition of claim 1, wherein the solubilized bismuth catalyst comprises bismuth methane sulphonate.

5. The electrodepositable coating composition of claim 1, wherein the guanidine comprises a compound according to the structure:

TABLE 17

Comparisons of Cure Response

| Example | Wt. Ratio Bi to BCG | Molar Ratio Bi to BCG | Phosphate (ppm) | Volt. (V) | Current (amps) | Time (min.) | Bath Temp. (° F.) | DFT (mils) | Cure Rating |
|---|---|---|---|---|---|---|---|---|---|
| Comp. Ex. E | — | — | 880 | 250 V | 0.5 | 2.0 | 90 | 1.8 | 2 |
| Ex. F | 1:0.25 | 1:0.37 | 880 | 250 V | 0.5 | 2.0 | 90 | 1.6 | 6 |
| Comp. Ex. G | — | — | 0 | 200 V | 0.5 | 2.0 | 90 | 1.0 | 7 |

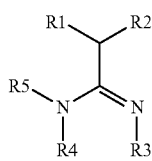

wherein each of R1, R2, R3, R4, and R5 independently comprise hydrogen, (cyclo) alkyl, aryl, aromatic, organometallic, a polymeric structure, or two or more together form a cycloalkyl, aryl, or an aromatic structure.

6. The electrodepositable coating composition of claim 1, wherein the guanidine comprises a cyclic guanidine.

7. The electrodepositable coating composition of claim 1, wherein the guanidine comprises 1,5,7-triazabicyclo [4.4.0] dec-5-ene.

8. The electrodepositable coating composition of claim 1, wherein the electrodepositable coating composition further comprises a pigment and a dispersing acid comprising a phosphorus acid.

9. The electrodepositable coating composition of claim 1, wherein the electrodepositable coating composition further comprises a source of phosphate ions.

10. The electrodepositable coating composition of claim 9, wherein the source of phosphate ions comprises carry-over from a phosphate-containing pretreatment composition, and/or the source of phosphate ions comprises a dispersing acid comprising a phosphorus acid.

11. A method of treating the electrodepositable coating composition of claim 1, the method comprising:
adding additional guanidine, additional at least partially solubilized bismuth catalyst, or a combination thereof to the electrodepositable coating composition.

12. A method for coating a substrate comprising the steps of:
pretreating a metal substrate with a metal phosphate pretreatment composition to form a pretreated metal substrate; and
electrodepositing a coating from the electrodepositable coating composition of claim 1 onto the pretreated metal substrate.

13. A method for coating a substrate comprising the steps of:
contacting a metal substrate with a phosphate-containing composition to form a treated metal substrate; and
electrodepositing a coating from the electrodepositable coating composition of claim 1 onto the treated metal substrate.

14. A method of maintaining the electrodepositable coating composition of claim 1, wherein the electrodepositable coating composition is subject to phosphate contamination, the method comprising:
measuring the concentration of solubilized bismuth metal and/or phosphate ions in the electrodepositable coating composition;
measuring the concentration of guanidine in the electrodepositable coating composition; and
adding guanidine in an amount sufficient to adjust a weight ratio of solubilized bismuth metal from the solubilized bismuth catalyst to guanidine of from 1.00: 0.071 to 1.0:2.1 and/or to adjust a molar ratio of bismuth metal to guanidine of from 1.0:0.25 to 1.0:3.0.

15. A system for coating metal substrates, the system comprising:
a pretreatment composition comprising a metal phosphate; and
the electrodepositable coating composition of claim 1; wherein the electrodepositable coating composition has a weight ratio of bismuth metal from the solubilized bismuth catalyst to guanidine of from 1.00:0.071 to 1.0:2.1 and/or a molar ratio of bismuth metal to guanidine of from 1.0:0.25 to 1.0:3.0.

* * * * *